(12) United States Patent
Buehman et al.

(10) Patent No.: US 9,825,459 B2
(45) Date of Patent: Nov. 21, 2017

(54) DISCONNECT SPLICE BLOCK AND MODULAR SURGE DEVICE

(71) Applicant: ERICO International Corporation, Solon, OH (US)

(72) Inventors: Ernest Richard-Dean Buehman, Maple Heights, OH (US); Nicholas J. Ambrogio, Highland Heights, OH (US); Daniel Watson, North Royalton, OH (US); Daniel A. Pfaff, Burlingame, CA (US); Thomas R. Bockstoce, Akron, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 227 days.

(21) Appl. No.: 14/621,615

(22) Filed: Feb. 13, 2015

(65) Prior Publication Data

US 2015/0229065 A1 Aug. 13, 2015

Related U.S. Application Data

(60) Provisional application No. 61/939,310, filed on Feb. 13, 2014.

(51) Int. Cl.
*H01R 13/453* (2006.01)
*H02H 9/04* (2006.01)
(Continued)

(52) U.S. Cl.
CPC .............. *H02H 9/04* (2013.01); *H01R 9/2441* (2013.01); *H01R 13/70* (2013.01); *H01R 25/142* (2013.01); *Y10T 29/49117* (2015.01)

(58) Field of Classification Search
CPC .................................................... H02H 1/0061
(Continued)

(56) References Cited

U.S. PATENT DOCUMENTS 3,491,330 A * 1/1970 Barnhart ............ H01R 13/6453
439/681
4,380,038 A 4/1983 Roudeau
(Continued)

FOREIGN PATENT DOCUMENTS

EP 0711012 A1 5/1996
WO 199004455 A1 1/1999

OTHER PUBLICATIONS

International Search Report and Written Opinion from corresponding International Application No. PCT/US2015/015764, dated May 22, 2015.
(Continued)

*Primary Examiner* — Neil Abrams
(74) *Attorney, Agent, or Firm* — Quarles & Brady LLP

(57) ABSTRACT

An electrical coupling device, such as a surge protector for a rail or other conductive structure, includes a pair of terminals, and a jumper for selectively electrically coupling and decoupling the terminals. Movement of the jumper may expose part of the jumper or one or both of the terminals, such as for use as a test point. A surge module with one or more surge protection features may fit into a base that includes the terminal and the jumper. The module may have an interface feature, such as a protruding post, that prevents engagement with the base if the base is not properly engaged with the rail or other structure. In one embodiment, a threaded rod may serve as the jumper and in one position electrically couples the terminals and in another position electrically decouples the terminals and one end of the threaded rod becomes exposed for use as a test point.

19 Claims, 19 Drawing Sheets

(51) Int. Cl.
  *H01R 9/24* (2006.01)
  *H01R 13/70* (2006.01)
  *H01R 25/14* (2006.01)

(58) Field of Classification Search
  USPC ......... 361/118, 119; 439/507, 509, 709, 922
  See application file for complete search history.

(56) References Cited

U.S. PATENT DOCUMENTS

| | | | | |
|---|---|---|---|---|
| 4,541,682 | A * | 9/1985 | Gerke | H01R 4/2429 |
| | | | | 439/101 |
| 4,851,967 | A * | 7/1989 | Gerke | G01R 1/0416 |
| | | | | 361/823 |
| 5,023,745 | A | 6/1991 | Glass | |
| 5,114,356 | A * | 5/1992 | Taybl | H04Q 1/142 |
| | | | | 439/131 |
| 5,173,060 | A * | 12/1992 | Shimirak | H01R 4/2408 |
| | | | | 439/416 |
| 5,260,994 | A * | 11/1993 | Suffi | H04M 1/24 |
| | | | | 361/736 |
| 5,476,392 | A * | 12/1995 | Inaba | B60L 3/00 |
| | | | | 439/341 |
| 5,588,881 | A | 12/1996 | Eggert et al. | |
| 5,844,763 | A * | 12/1998 | Grace | H01R 13/6666 |
| | | | | 361/111 |
| 5,860,829 | A | 1/1999 | Hower et al. | |
| 6,188,560 | B1 * | 2/2001 | Waas | H01R 4/2408 |
| | | | | 361/119 |
| 6,506,071 | B2 * | 1/2003 | Lange | H01R 9/26 |
| | | | | 439/358 |
| 6,848,951 | B1 * | 2/2005 | Bechaz | H01R 9/2491 |
| | | | | 439/716 |
| 6,940,021 | B2 * | 9/2005 | Pohl | H01H 9/10 |
| | | | | 174/137 R |
| 6,984,147 | B2 * | 1/2006 | Tricaud | H04Q 1/20 |
| | | | | 379/412 |
| 7,110,534 | B1 * | 9/2006 | Mullaney | H01R 9/2433 |
| | | | | 379/325 |
| 7,690,952 | B2 * | 4/2010 | Koellmann | H01R 9/26 |
| | | | | 439/716 |
| 8,062,076 | B2 * | 11/2011 | Henke | H01R 9/2633 |
| | | | | 439/532 |
| 8,574,004 | B1 * | 11/2013 | Tarchinski | B60L 3/0046 |
| | | | | 439/181 |
| 8,727,797 | B2 | 5/2014 | Parrish et al. | |
| 8,988,842 | B2 * | 3/2015 | Gillespie | H01R 9/2433 |
| | | | | 361/118 |
| 8,998,654 | B2 * | 4/2015 | Donhauser | H01R 13/02 |
| | | | | 439/709 |
| 9,039,441 | B2 * | 5/2015 | Takamori | H01R 12/62 |
| | | | | 439/495 |
| 9,110,102 | B2 * | 8/2015 | Kesler | G01R 1/206 |
| 9,397,459 | B2 * | 7/2016 | Butcher | H01R 33/95 |
| 2002/0196593 | A1 | 12/2002 | Kizis et al. | |
| 2009/0009921 | A1 | 1/2009 | Wosgien | |
| 2012/0081827 | A1 | 4/2012 | Gillespie et al. | |
| 2012/0081828 | A1 | 4/2012 | Gillespie et al. | |
| 2013/0106567 | A1 | 5/2013 | Depping et al. | |

OTHER PUBLICATIONS

"Rail Transient Barrier Products for Data and Signal Line Protection," ERICO, Copyright 2014, 2 pages.
"Terminal Block," ERICO Critec, Copyright 1999, 1 page.

\* cited by examiner

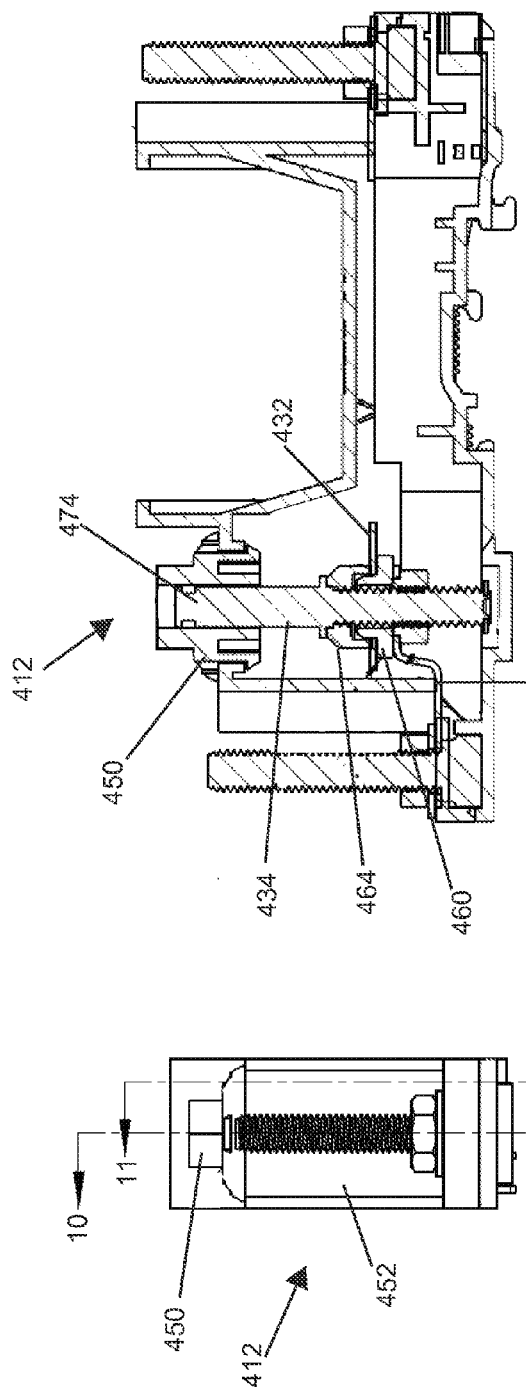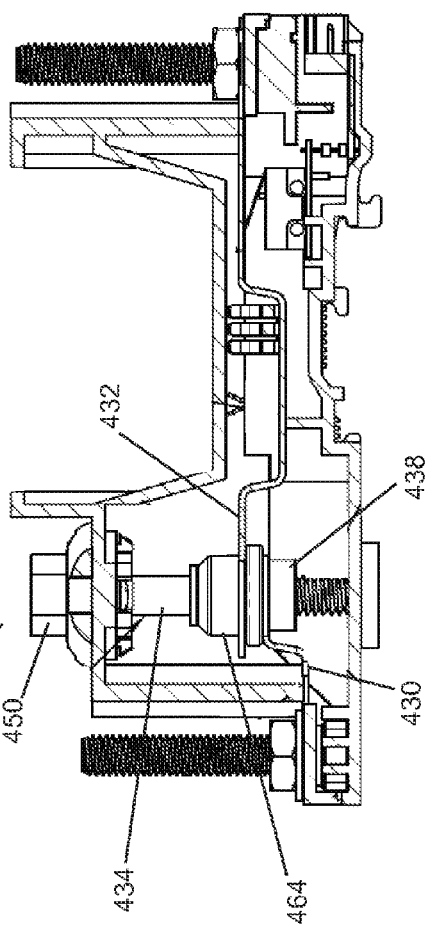

DISCONNECT SPLICE BLOCK AND MODULAR SURGE DEVICE

This application claims priority to U.S. Provisional Application 61/939,310, filed Feb. 13, 2014, which is incorporated by reference in its entirety.

BACKGROUND OF THE INVENTION

Technical Field of the Invention

This invention relates to electric over-voltage and surge protection, and more specifically, to voltage surge protection of electrical circuits such as those used in railroad and other applications.

Description of the Related Art

Voltage excursions are frequently encountered which may damage or destroy sensitive electronic equipment and components. Examples of these voltage excursions are, but not limited to, electrical surges, voltage transients, over voltages, lightning energy, induced voltages, current surges, switching transients, etc. These will be referred to generally as electrical surges.

In a railroad installation which contains electrical equipment, such as a signal bungalow or enclosure, it is a common practice to protect critical electrical control circuits such as those controlling the track signals from electrical surges. These surges may be attributable to lightning or other known or unanticipated sources which create an unusually high voltage on the circuit. Surge protection is important because high voltage surges may destroy electrical components or contribute excessive electrical noise to a circuit causing it to malfunction or otherwise perform unpredictably.

To prevent damage from electrical surges, over-voltage or lightning arrestors are used to couple the energy from the circuit to ground when an electrical voltage surge is detected on the circuit exceeding a predetermined voltage with respect to a reference point. This effectively redirects the energy of the electrical surge to ground and protects the sensitive electrical circuit components. When it is necessary to protect more than one circuit, a surge arresting device is coupled to each circuit and attached to a ground bus. There may be several devices employed in this manner. The ground bus is then connected to an outside reference ground.

SUMMARY OF THE INVENTION

Described herein are various embodiments which provide various advantages. One aspect is a disconnect which can be incorporated into terminal blocks and modular surge devices containing the following: one or more terminals (test point) which become exposed when the disconnect is actuated; a latching or locking mechanism which holds the jumper away from the terminals, thereby opening the circuit; and a rotating or linearly (vertical, horizontal, or any angle in between) moving conductive jumper which is a stand-alone component or subassembly. The terminals may be exposed such that alligator clips or electrical probes may attach. The terminals are shaped in such a manner to provide additional strength for the attachment of test clips or probes. The latching or locking mechanism may also provide an insulation barrier between the aforementioned terminals.

Another aspect is a surge protector or other modular device that includes a poka-yoke post, with the device using the clamping fastener of the grounding mechanism and the interference feature (poka-yoke post) incorporated into the surge module to prevent final assembly and complete installation until a proper grounding connection is made.

Still another aspect is a base with modular surge device which incorporates threaded binding posts as opposed to standard cage terminals as an electrical connection method. This is opposed to a standard, non-modular binding post terminal block which utilizes bolted connections for the surge module.

According to further aspects of the invention, an electrical coupling device includes: a pair of electrical terminals; and a jumper selectively electrically coupling the terminals together. The coupling device may include one or more of the following features: the coupling device is part of a surge protection device; the coupling device is part of a terminal block; the coupling device is a switch device; the jumper is part of a movable member that moves to couple and decouple the terminals together; the movable member is a button that is able to be pushed by the user; the button is pushed against a spring force from a spring; the movable member includes a carrier that moves along with the jumper; the movable member turns as part of the movement process; moving the movable member uncovers one or more portions of the terminals, to allow access to one or both of the terminals, such as for testing; the movable member is a finger-safe disconnect; the terminals include respective binding posts or cage clamps; the terminals and the jumper are located within a housing; and/or the housing is configured for receiving a surge module to engage the electrical terminals.

According to still further aspects of the invention, a modular surge protection device includes: a base; and a surge module that engages the base. The device may include one or more of the following features: any feature or combination of features of the previous paragraph; the surge module contains one or more surge protection components; the one or more surge protection components includes one or more of spark gaps, gas discharge tubes, metal oxide varistors (MOV), silicon avalanche diodes (SADS), positive temperature coefficient (PTC) thermistors, circuit breakers, and/or fuses; the surge components are contained within a thermoplastic housing which forms a primary structure of the surge module; the surge module includes metallic electrodes protruding from the bottom face of the thermoplastic housing, for coupling the surge module to electrical terminals of the base; the base includes a connection to a structural member; the connection serves as a connection to ground for the base; the connection includes a fastener coupled to a ground conductor; the fastener includes a screw, nut, lever, or other device; the surge module has an interface feature that engages a corresponding feature on the base; the interface feature is a poka-yoke post; the interface feature prevents installation of the surge module on the base in an improper orientation; the interface feature prevents installation of the surge module on the base if the grounding connection is not properly installed; and/or incomplete installation of the fastener obstructs engagement of the surge module onto the base.

According to an aspect of the invention, an electrical coupling device includes: a base housing; a pair of electrical terminals; a jumper. The terminals and the jumper are located within the base housing. The jumper is part of a movable member that moves to selectively electrically couple and decouple the terminals together through the jumper. Moving the movable member selectively uncovers one or more portions of the terminals and/or the jumper as a test point, to allow electrical access to one or both of the terminals, such as for testing.

In an embodiment according to one or more paragraphs of this summary, the movable member rotates to move the jumper.

In an embodiment according to one or more paragraphs of this summary, rotation of the movable member moves the jumper axially.

In an embodiment according to one or more paragraphs of this summary, the jumper includes a threaded rod that engages a threaded hole in a member that is fixed with respect to at least one of the housing or the terminals.

In an embodiment according to one or more paragraphs of this summary, the test point is an exposable end of the jumper that is exposed when terminals are electrically decoupled.

In an embodiment according to one or more paragraphs of this summary, the jumper passes through respective concentric holes in the terminals.

In an embodiment according to one or more paragraphs of this summary, the device includes an insulator that the jumper passes through; and the insulator is between parts of the terminals, and maintains separation between the terminals.

In an embodiment according to one or more paragraphs of this summary, the jumper includes an annular member that presses against and electrically couples to one of the terminals, around as the hole in the one of the terminals.

In an embodiment according to one or more paragraphs of this summary, the device includes respective binding posts electrically coupled to the terminals.

In an embodiment according to one or more paragraphs of this summary, the device includes a mounting for mounting and electrically coupling the device to a rail.

In an embodiment according to one or more paragraphs of this summary, the mounting includes one or more of clamps, mounting bolts, or snap clips.

In an embodiment according to one or more paragraphs of this summary, the device is in combination with a surge module mechanically coupled to the base housing and engaging the electrical terminals. The surge module includes: a surge module housing; one or more surge protection components within the surge module housing; and metallic electrodes protruding from a bottom face of the surge module housing, for electrically coupling the one or more surge protection components to the electrical terminals.

In an embodiment according to one or more paragraphs of this summary, the surge module includes an interface feature that engages a corresponding feature on the base housing, to prevent mechanical coupling of the surge module with the base housing at an improper orientation, and/or if the base housing is not properly installed on a structural member.

In an embodiment according to one or more paragraphs of this summary, the movable member translates to move the jumper.

In an embodiment according to one or more paragraphs of this summary, translation of the movable member rotates the jumper to selectively electrically couple and decouple the terminals together.

In an embodiment according to one or more paragraphs of this summary, translation of the movable member translates the jumper to selectively electrically couple and decouple the terminals together.

According to another aspect of the invention, an electrical coupling device includes: a base that includes: a base housing; and a pair of electrical terminals; and a surge module mechanically coupled to the base housing and engaging the electrical terminals. The terminals are located within the base housing. The surge module includes: a surge module housing; one or more surge protection components within the surge module housing; and metallic electrodes protruding from a bottom face of the surge module housing, for electrically coupling the one or more surge protection components to the electrical terminals.

According to yet another aspect of the invention, a surge module for coupling to a base to be mounted on a structural member, includes: a surge module housing; one or more surge protection components within the housing; and an interface feature that engages a corresponding feature on the base, to prevent mechanical coupling of the surge module with the base at an improper orientation, and/or if the base is not properly installed on the structural member.

In an embodiment according to one or more paragraphs of this summary, the interface feature is a post that protrudes from surge protection housing, to engage a hole in the base.

In an embodiment according to one or more paragraphs of this summary, the one or more surge protection components includes one or more of spark gaps, gas discharge tubes, metal oxide varistors (MOV), silicon avalanche diodes (SADS), positive temperature coefficient (PTC) thermistors, circuit breakers, and/or fuses.

According to still another aspect of the invention, a method of providing surge protection includes: installing a base on a structural member, with a grounding member of the base electrically coupling to the structural member; and after the installing, mechanically and electrically coupling a surge module to the base, wherein an interface feature of the structural member prevents mechanical coupling of the surge module with the base at an improper orientation or if the base is not properly installed on the structural member.

In an embodiment according to one or more paragraphs of this summary, the installing the base includes using a fastener to couple the base to the structural member; and the interface feature is configured to engage the fastener to prevent coupling of the surge module to the base if the fastener incompletely couples the base to the structural member.

In an embodiment according to one or more paragraphs of this summary, the structural member is a rail; the fastener is a threaded fastener; and the installing include threading the fastener into the rail.

In an embodiment according to one or more paragraphs of this summary, the coupling the surge module to the base includes coupling metallic electrodes protruding from a bottom face of the surge module, to electrodes of the base that are electrically coupled to the structural member during the installing of the base.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 9 is an end view of the device of FIG. 8.

FIG. 10 is a side sectional across section 10-10 of FIG. 9.

FIG. 11 is a side sectional across section 11-11 of FIG. 9.

DETAILED DESCRIPTION

Figure 1:
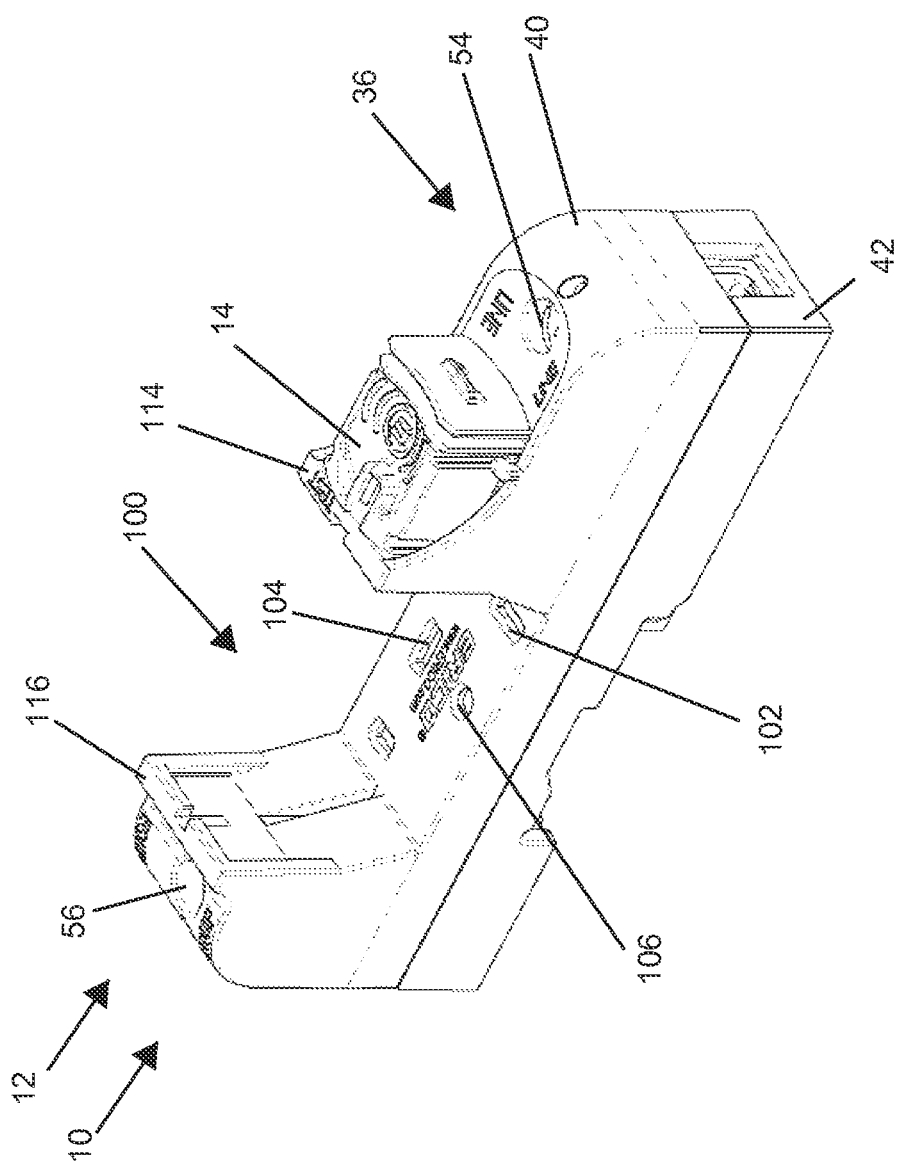
FIG. 1 is an oblique view of an electrical device (or base of a device) in accordance with an embodiment of present invention.

An electrical coupling device, such as a surge protector for a rail or other conductive structure, includes a pair of terminals, and a jumper for selectively electrically coupling and decoupling the terminals. Movement of the jumper may expose part of the jumper or one or both of the terminals, such as for use as a test point. A surge module with one or more surge protection features may fit into a base that includes the terminal and the jumper. The module may have an interface feature, such as a protruding post, that prevents engagement with the base if the base is not properly engaged with the rail or other structure.

Three aspects of the invention are discussed in turn: 1) a disconnect for terminal blocks, splice blocks, and surge devices; 2) a feature to ensure proper grounding of a modular surge device; and 3) a modular surge device comprised of a base with binding posts and plug-in surge module.

Disconnect for Terminal Blocks, Splice Blocks, and Surge Devices

A terminal block, modular surge protection device, or stand-alone switch device incorporates an electrical disconnect mechanism (hereafter referred to as the "disconnect"). The disconnect also serves to provide one or more electrodes (hereafter referred to as "test points") which function as part of the disconnect as well as a means of testing the electrical circuits which conduct through the terminal block. In this particular embodiment, the disconnect is constructed utilizing a component or subassembly comprised of a metallic connection or bar (hereafter referred to as the "jumper"), optional button (interface component or cover which may contain the jumper), two terminals (each representing "input" and "output" sides of circuit) and a spring-loaded platform (hereafter referred to as the "slider") which assists in the disconnect action.

When the disconnect is actuated either by means of a secondary tool or human finger, the jumper moves away from the terminals and thus opens the electrical circuit passing through itself, the terminals and the primary conductive path of the terminal block. The jumper is then held in place by friction, a latch, slider (which may be spring-loaded as in this embodiment) or any combination thereof. When actuated, the disconnect exposes at least one test point which serves as an attachment point for electrical probes such as a multi-meter, HI-POT tester or similar testing equipment. The test points are each simultaneously connected to one terminal (i.e. one terminal is connected to the input or output but not both).

Primary benefits of this design are compact size, finger-safe per IP20 (NEMA & IEC) as well as maintaining the functionality of legacy products that provide a disconnect with electrodes for the attachment of electrical probes. In an embodiment the terminals (which are also the test points) are curved such that the curved faces of the jumper mate in a way to provide sufficient electrical contact between the jumper and two terminals. The primary embodiment does not require the curvature of the terminals. Alternative embodiments are enhanced by this optional design feature by allowing for a more compact design. Additionally, the curvature of the terminals allows for improved mating with alligator/crocodile/spring clips by eliminating smooth, flat faces.

In one embodiment, the jumper is acted on by a button which serves to move the jumper vertically. The button is pushed downward in a vertical motion until the test point(s) are exposed. In this second position of both embodiments, the jumper is moved (by way of its mates to the button) to a lower position such that the jumper no longer makes contact with the terminals. In an embodiment, the jumper and button are substantially rotated about a central axis to the "Open" position of the disconnect thereby locking the mechanism in place and/or increasing distance between the jumper and the terminals. In this second position the slider or optional button serve as an insulation barrier to shorting between the input and output terminals while in the "Open" position. Optionally, the test point terminals may be curved, provided with a small bend at the top which create edges or knurled for improved grip by an alligator clip. In a third embodiment, the button takes the form of a toggle or lever which rotates to act on the jumper and slider to move to a lower position such that the jumper no longer makes contact with the terminals.

The invention is primarily suited to implementation in terminal blocks and modular surge devices. The need for the invention arises from the necessity to replace existing disconnect mechanisms which require a greater usage of space, have lesser functionality or are not incorporated into a terminal block or modular surge device. Existing modular surge devices and terminal blocks typically do not incorporate a disconnect mechanism. Existing terminal blocks in the railroad industry do not incorporate such a compact and finger-safe design. The addition of compliance with AREMA (The American Railway Engineering and Maintenance-of-way Association) specifications allows this product to replace the "golden nut" which is commonly seen with AAR (Association of American Railroads) binding posts which are used in less compact designs. Said posts are defined by AREMA Standard 14.1.10.

Referring to FIGS. 1-5, an embodiment electrical coupling device 10 includes a disconnect feature. The coupling device 10 shown is a base 12 that is configured to receive a surge module, which is described further below, and may also be considered part of the coupling device 10. The device 10 includes a button or cover 14, a jumper 16, a carriage or slider 18, a spring 20, a pair of electrodes or electrical terminals 30 and 32, and a housing 36 that includes a housing module bottom 40 and a housing module top 42. The terminals 30 and 32 provide a first electrical connection and a second electrical connection. In the illustrated embodiment the electrical connections of the terminals 30 and 32 are accessed through slots in the sides of the housing 36, where wires or other conductors may be inserted and may be secured using screws 50 and 52, in a caged clamp terminal arrangement. The heads of the screws which may be accessed through openings 54 and 56 in the top of the housing 36.

The base 12 also includes an electrically-conductive grounding connector 60 for electrically and mechanically coupling to a structure member such as a rail (e.g., a DIN rail). The grounding connector 60 includes a pair of metal pieces 62 and 64. The grounding connector 60 includes a series of receivers 66 for receiving a ground electrode of a surge module (described further below). The bottom piece 62 includes a pair of hooked ends 68 and 70 for receiving a DIN rail. The top piece 64 has toothed edges 72 for making electrical connection with the parts of the top of the DIN rail. A threaded fastener (a screw) 74 passes through a hole in the top piece 64, and engages a threaded hole in the bottom piece 62 The threaded fastener 74 is used to provide a clamping force on the top piece 64 against the DIN rail, to press the toothed edges 72 against parts of the DIN rail.

Figure 2:
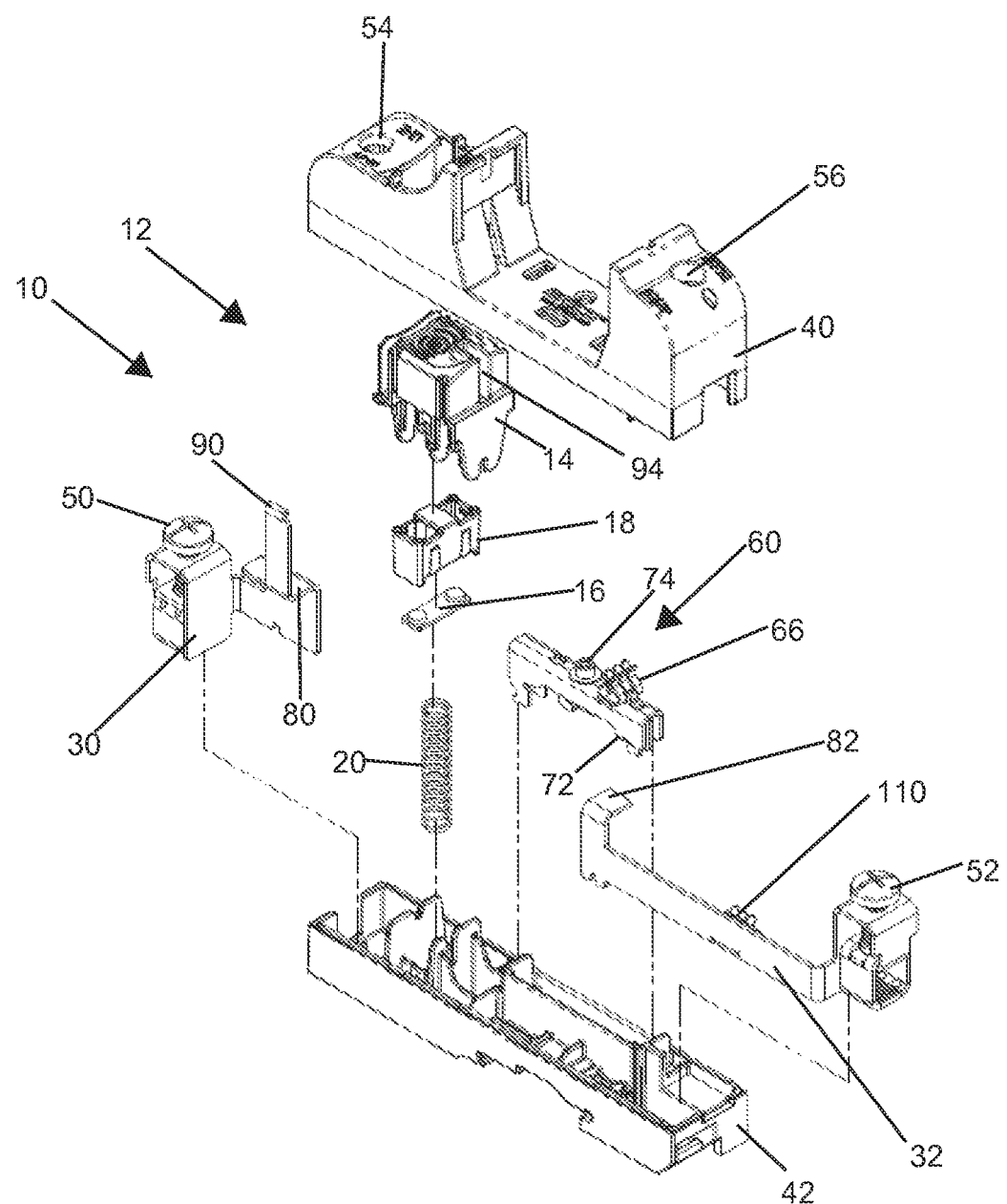
FIG. 2 is an exploded view of the device of FIG. 1.
Figure 3:
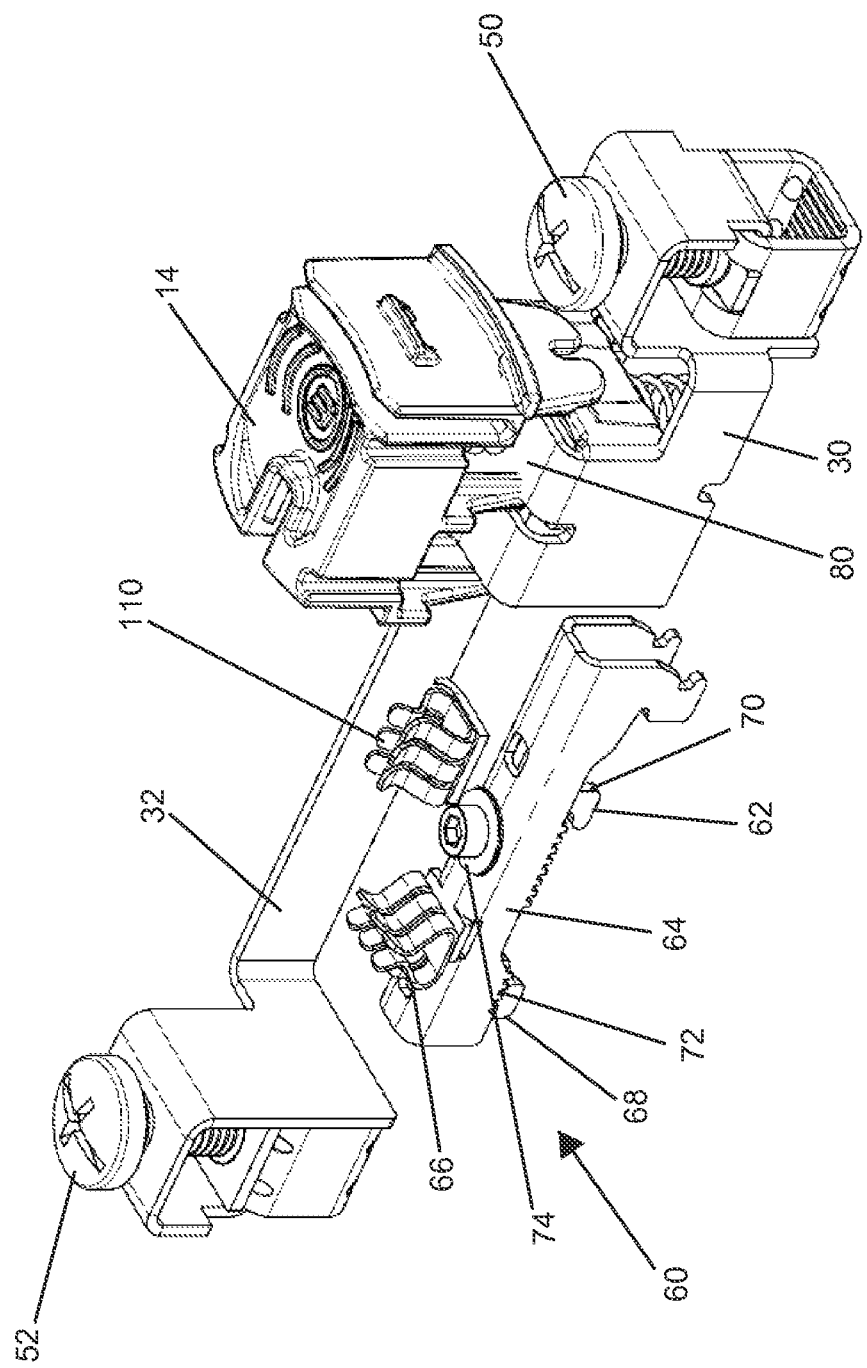
FIG. 3 is an oblique view of the device of FIG. 1, with the housing of the device removed for illustration purposes.
Figure 5:
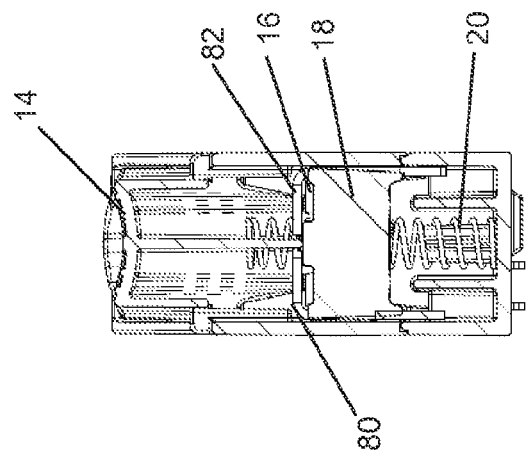
FIG. 5 is an end sectional view across section 5-5 of FIG. 4.
Figure 4:
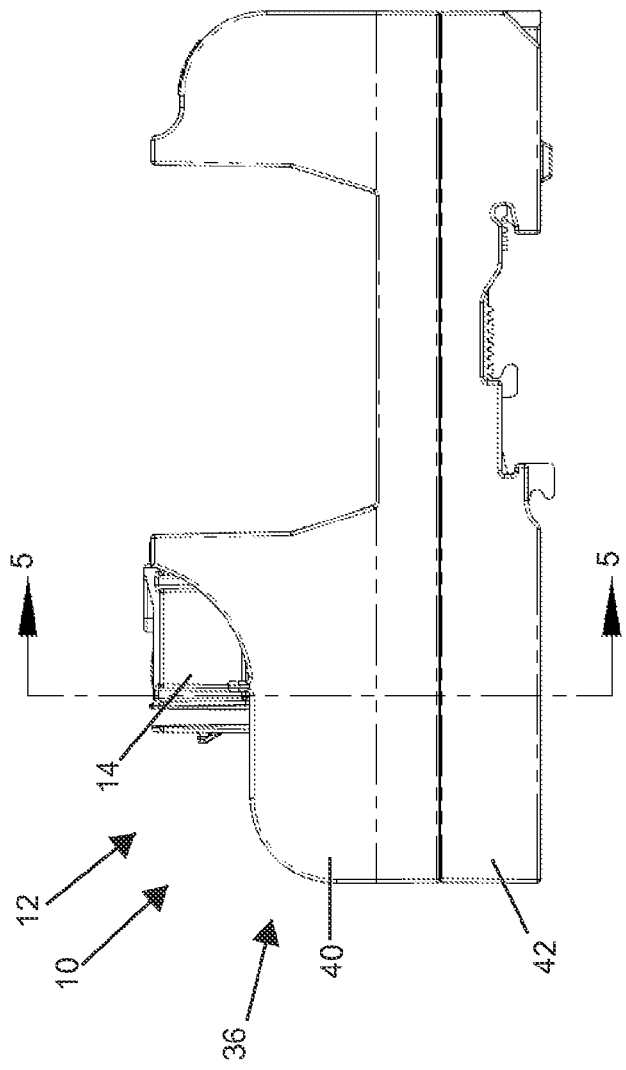
FIG. 4 is a side view of the device of FIG. 1.

The coupling device 10 is normally in the closed position that is illustrated in the figures. In the closed position the jumper 16 makes an electrical connection between the terminals or electrodes 30 and 32, electrically coupling the terminals 30 and 32 together. With reference in particular to FIG. 2, the spring force from the spring 20 urges the jumper 16, which is located within the carriage or slider 18, against the underside of respective flanges 80 and 82 of the terminals 30 and 32. The jumper 16, which is made of an electrically conductive material such as a suitable metal, may have protrusions 84 and 86 that allow contact to be made through windows 90 and 92 in the carriage 18.

The coupling device 10 may be placed in an open position, in which the terminals are electrically decoupled, by pressing down on the button or cover 14. The cover 14 is a movable member in which the jumper 16 and the carriage 18 are secured. Pressing down on the cover 14 moves the cover 14, the jumper 16, and the carriage 18 all downward against the force of the spring 20. This takes the jumper 16 out of contact with the flanges 80 and 82 of the terminals 30 and 32, thus electrical decoupling the terminals 30 and 32 from one another.

The downward movement of the cover 14 also exposes a portion 90 of the terminal 30. The portion 90 is a distal end of a portion of the terminal 30 that is bent upward from the flange 80. The upward bent portion that includes the end 90 passes into and through a slot 94 in the cover 14. When the cover 14 is in its usual fully up position, the closed position of the device 10, the cover 14 prevents access to the portion 90. But when the cover 14 is pushed down the portion 90 is exposed, and may be used as a test point, for example to test electrical connections of the device 10. In the open position, the first terminal is electrically isolated from the second terminal to allow independent testing of the first terminal. Possible testing includes hipot, voltage measurements, current leakage, resistances or other electrical characteristics. The cover 14 may be maintainable in the downward position using a mechanical mechanism, or may have to be maintained in that position by the user.

The housing 36 has a series of features for receiving and coupling to the surge module. The surge module is to be received in a socket 100 in the housing. At the bottom of the socket 100 the housing has a series of openings for receiving various protrusions from a bottom face of the surge module. The openings include a ground electrode connection port 102 into which passes a ground electrode that is received by the receivers 66, a line electrode connection port 104 that receives a line electrode of surge module, and a post interface port 106 that receives a post that protrudes from the bottom face of the surge module. The line electrode of surge module is received by a receiver 110 that is part of the terminal or electrode 32. The post interface port 106 also allows access to the threaded fastener 74, to tighten the fastener 74 to properly install the base 12 on a DIN rail (or other structure).

The housing 36 has protruding ridges 114 and 116 on opposite sides of the socket 100. The ridges 114 and 116 are used in mechanically securing the surge module in the socket 100, as described further below.

Figure 6:
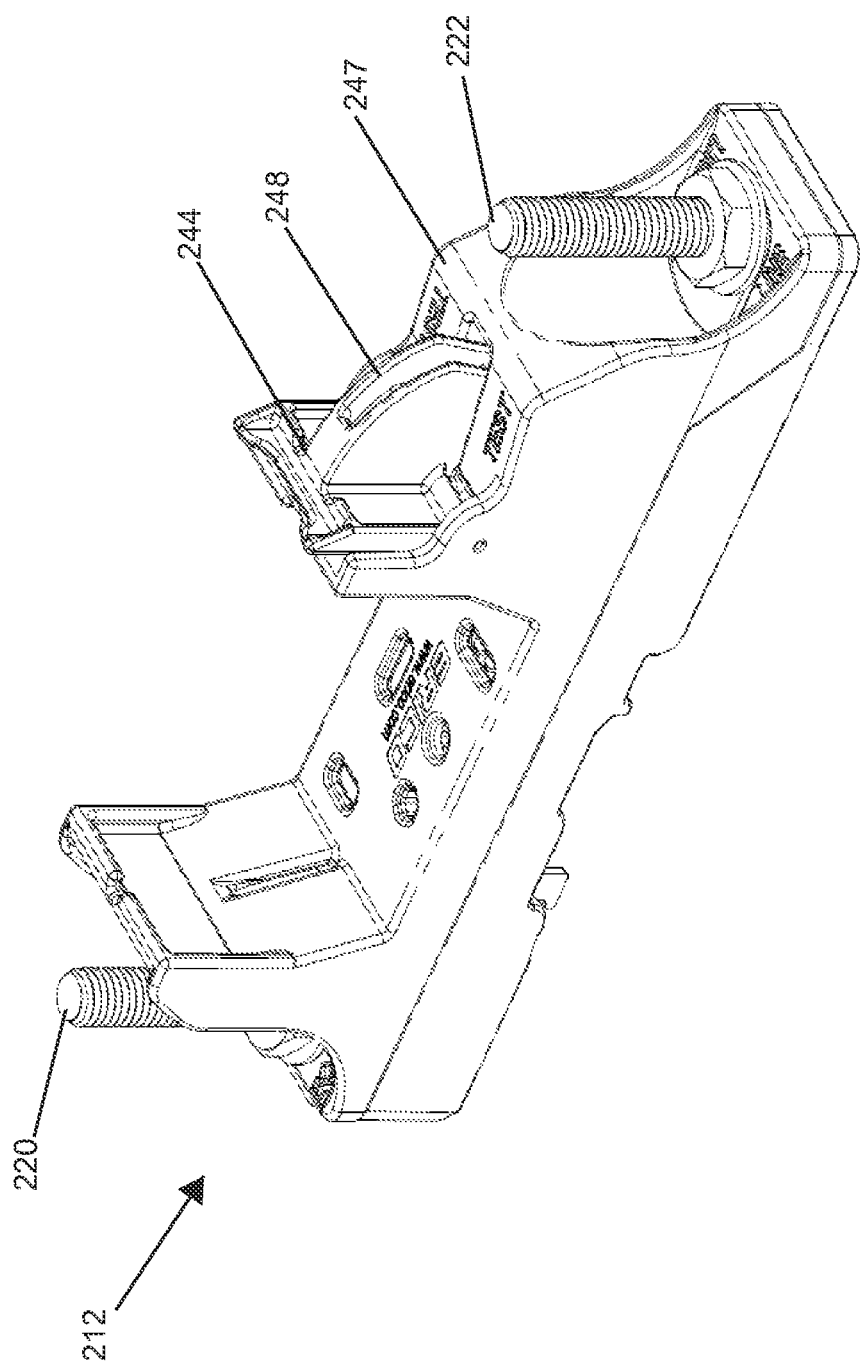
FIG. 6 is an oblique view of an electrical device (or base of a device) in accordance with another embodiment of the present invention.
Figure 7:
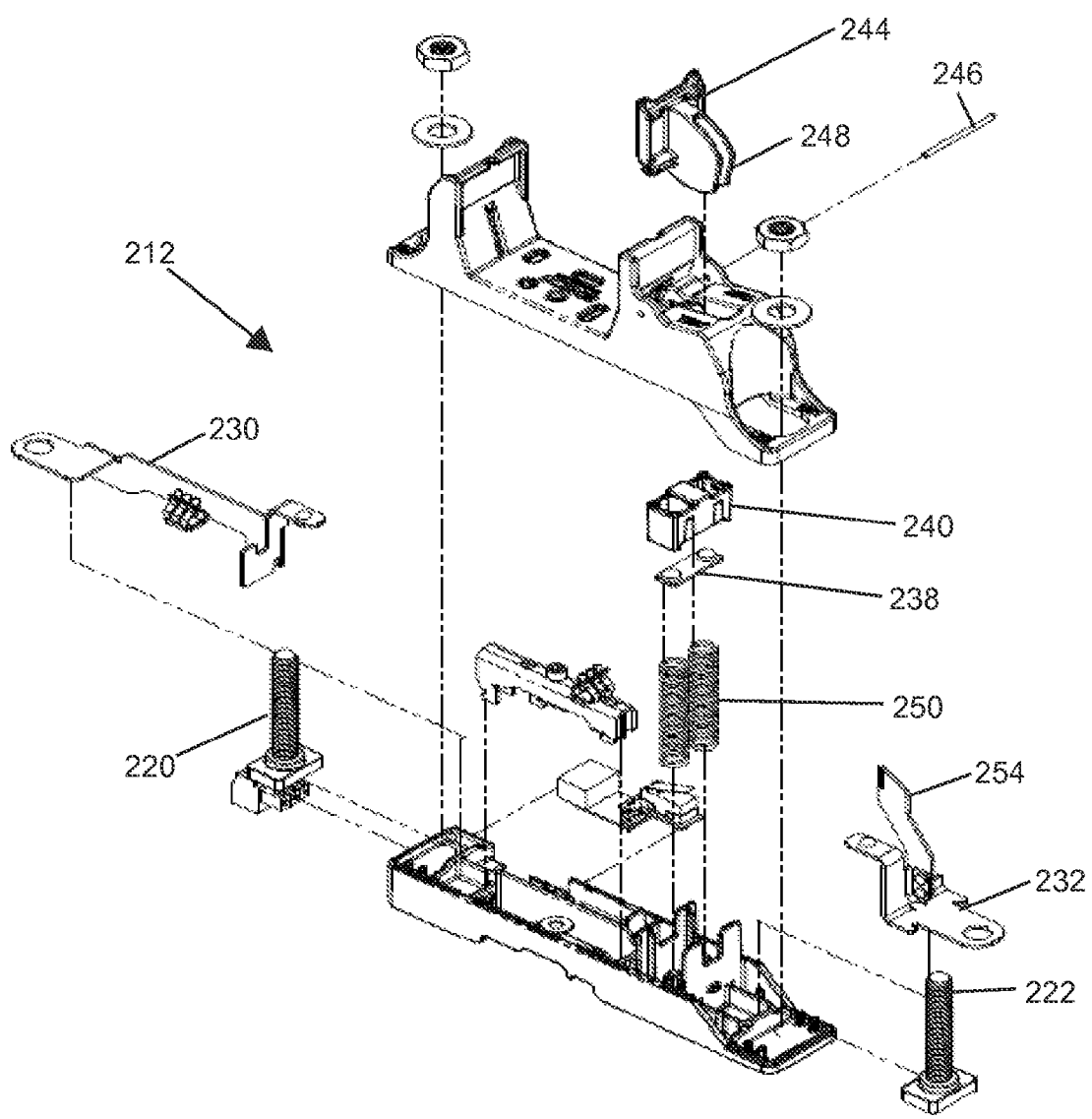
FIG. 7 is an exploded view of the device of FIG. 6.
Figure 8:
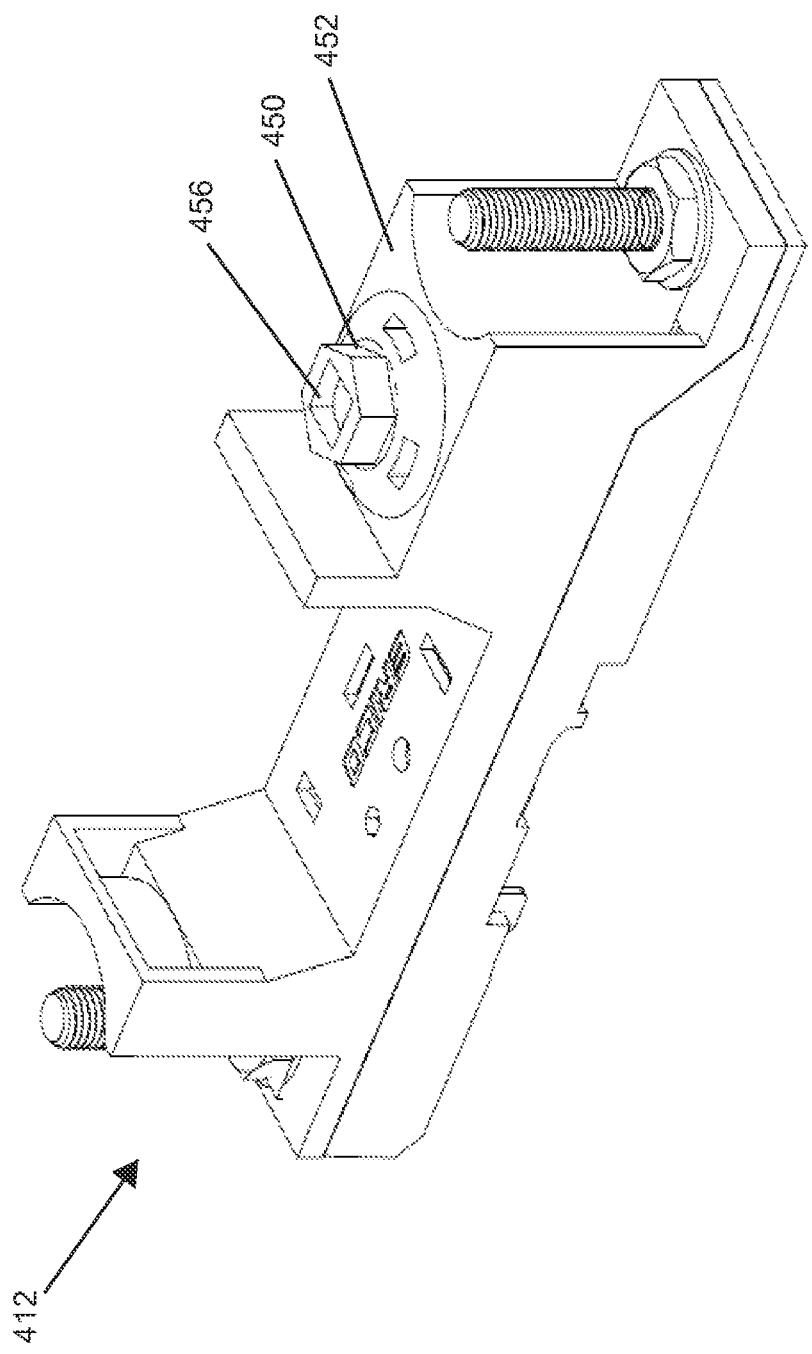
FIG. 8 is an oblique view of an electrical device (or base of a device) in accordance with yet another embodiment of present invention.

FIGS. 6 and 7 show an alternate embodiment, a base 212 that is (or is part of) an electrical coupling device. Many features of the base 212 are similar to those of the base 12 (FIG. 1), and the discussion below focuses on features of the base 212 that are different from those of the base 12.

The base 212 includes binding posts 220 and 222, threaded rods that are coupled to the electrodes or terminals 230 and 232. Connections, such as of wires or cables, may be made to the binding posts 220 and 222 using suitable hardware, such as washers and binding nuts.

The electrodes 230 and 232 are selectively coupled together by a jumper 238 that is in a carrier 240. In order to disengage the jumper 238 from the electrodes 230 and 232 (electrically decoupling the electrodes 230 and 232), a cover or movable member 244 is rotated downward, about a pin 246 that secures the member 244 to a housing 247. This causes cam surface edges 248 of the member 244 to press downward against the carrier 240, moving the carrier 240 and the jumper 238 downward, in opposition to a spring force from springs 250 that tends to keep the jumper 238 in contact with the electrodes 230 and 232.

The rotation of the member 244 to put the device in the open position also exposes a portion 254 of the electrode 232. This allows connection to the portion 254 for use as a test point.

Figure 12:
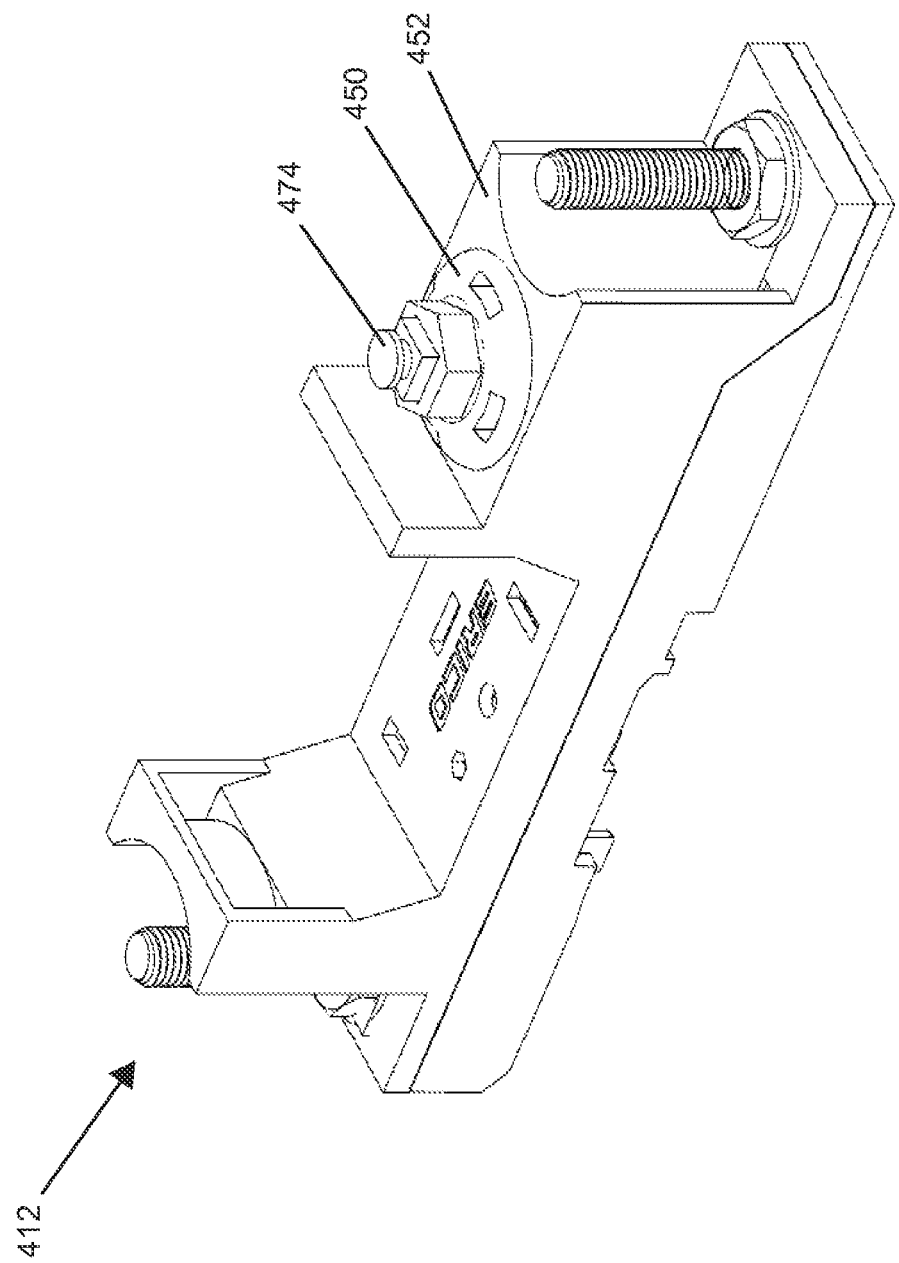
FIG. 12 is an oblique view of the device of FIG. 8, with the device in an open configuration.
Figure 14:
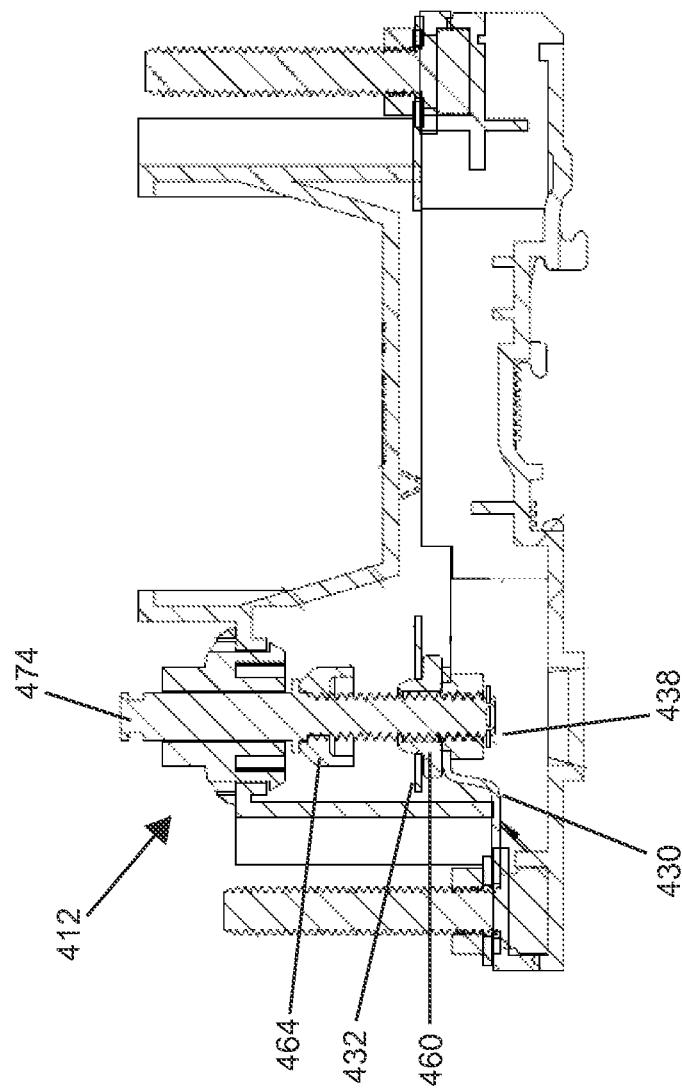
FIG. 14 is a side sectional across section 14-14 of FIG. 3.
Figure 13:
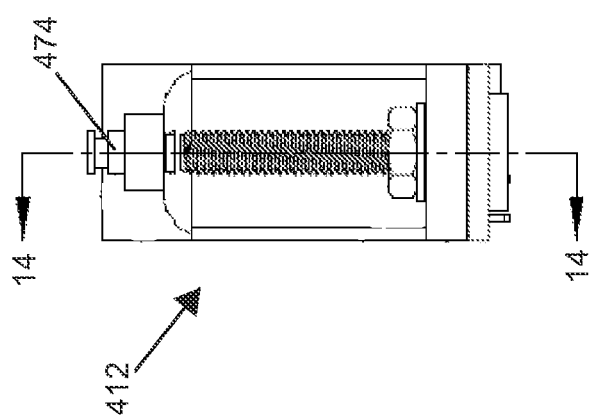
FIG. 13 is an end view of the open configuration device of FIG. 12.
Figure 15:
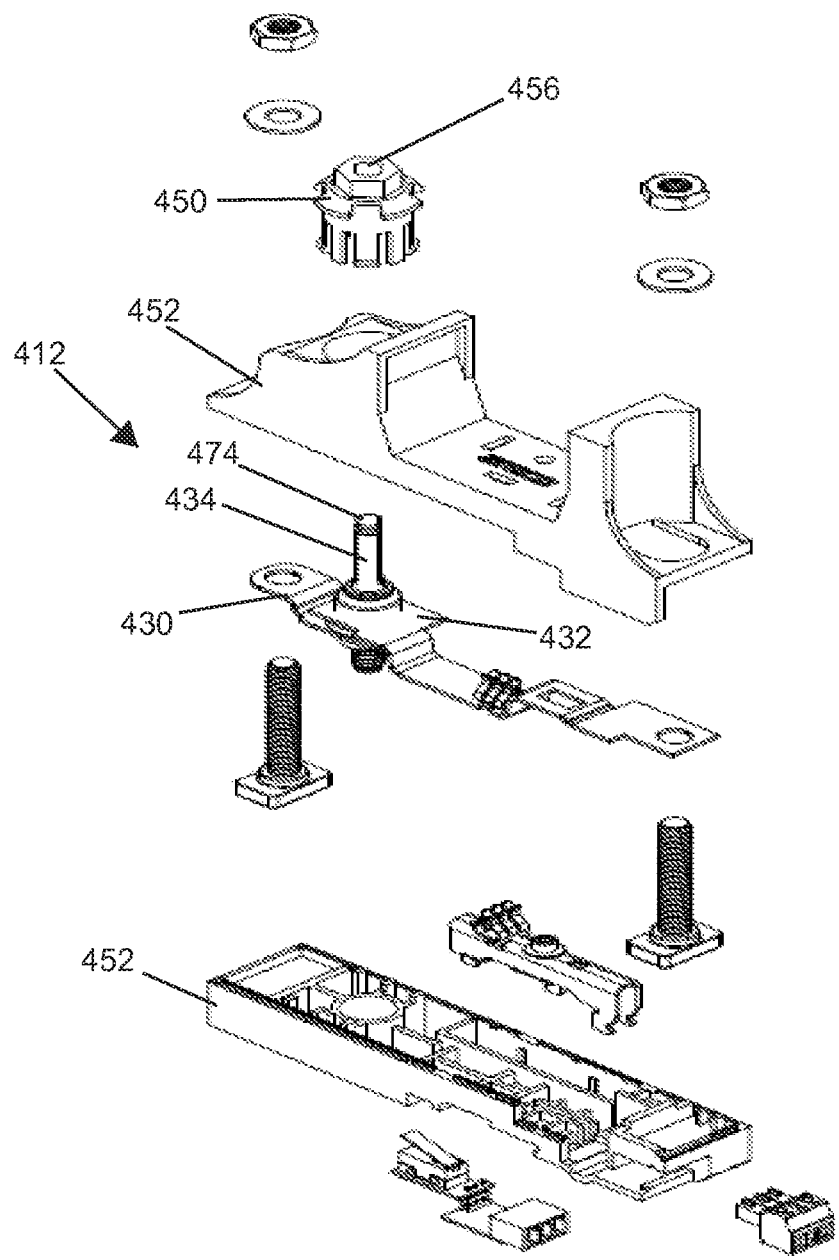
FIG. 15 is an exploded view of the device of FIG. 8.

Referring now to FIGS. 8-15, another embodiment, a base 412 (all or part of an electrical device) is shown. FIGS. 8-11 show the base device 412 in a closed position, FIGS. 12-14 show the base 412 in an open position, and FIG. 15 shows an exploded view of the device. Many features of the base 412 are similar to those of the base 12 (FIG. 1) and/or the base 212 (FIG. 6), and discussion of these similar features are omitted below. The main difference is in configuration of the electrodes/terminals, and the mechanism for selectively coupling and decoupling the terminals.

The terminals 430 and 432 overlap one another, and have concentric holes where they overlap. A jumper 434, in the form of a partially-threaded rod of electrically-conductive material, such as copper, passes through these concentric holes, and selectively electrically couples the terminals 430 and 432 together. The threaded end of the jumper rod 434 engages a nut 438 that is press-fit into the terminal 430 at the hole in the terminal 430. The jumper rod 434 is therefore always electrically coupled to the terminal 430. In addition the threaded connection between the jumper rod 434 and the nut 438 allows the jumper rod 434 to move axially within the concentric holes when the rod 434 is turned.

Turning of the jumper rod 434 about its axis is accomplished by turning a knob 450 which is on the outside of a housing 452. The top part of the rod 434 has a non-circular cross-section keyed shape, such as by having one or more flat surfaces, that corresponds to the cross-section shape of an opening 456 in the knob 450 that receives the upper end of the jumper rod 434. This keying feature allows the rod 434 to turn along with turning of the knob 450.

The terminals 430 and 432 never come into direct contact with one another, as there is an insulator 460 that is between them in the region of the concentric holes. The insulator 460 also extends into the hole in the terminal 432, to prevent undesired contact between the terminal 432 and the jumper rod 434 where the jumper rod 434 passes through the hole in the terminal 432.

Electrical connection between the jumper rod 434 and the terminal 432 is made by an annular member 464 that is part of the jumper rod 434. When the jumper rod 434 is threaded into the housing 452 by turning the knob 450, the annular member 464 makes contact with an annular portion of the terminal 432 that surrounds the hole in the terminal 432. This annular contact surface is also outside of (radial outward of) the portion of the insulator 460 that extends through the hole in the terminal 432. The threading of the rod 434 into the nut 438 provides pressure between the annular member 464 and the terminal 432, making a good electrical contact between the rod 434 and the terminal 432. This pressure also ensures a good electrical between the rod 434 and the terminal 430, in the vicinity of the nut 438.

The threaded jumper rod 434 may have a stop feature 470 on its bottom end, to prevent the jumper rod 434 from being disengaged from the nut 438 and removed from the device. A top end 474 of the jumper rod 434 is exposed above the top of the knob 450 when the jumper rod 434 is positioned in the open position, with the terminals 430 and 432 electrically decoupled from one another. The exposed top end 474 can serve as a test point.

Figure 16:
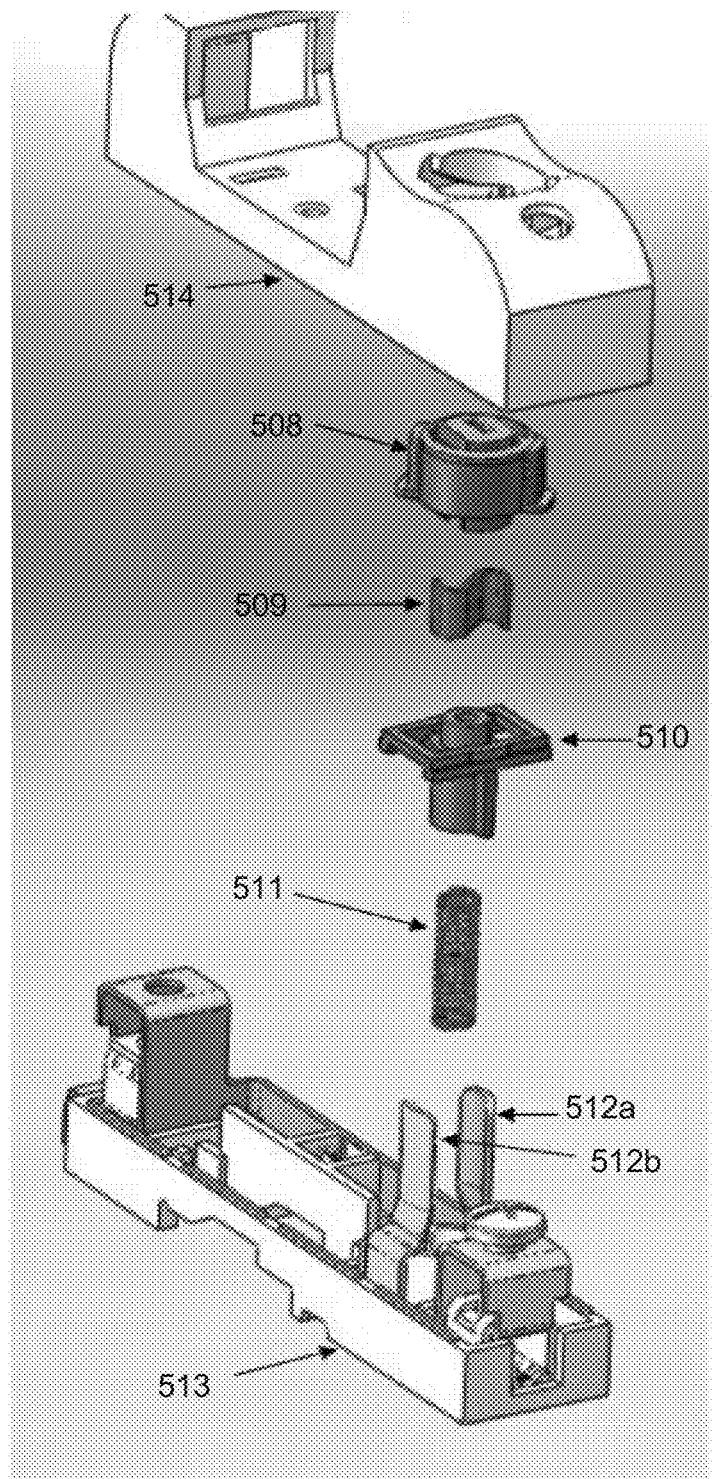
FIG. 16 is an exploded view of an electrical device (or base of a device) in accordance with still another embodiment of present invention.
Figures 17, 18:
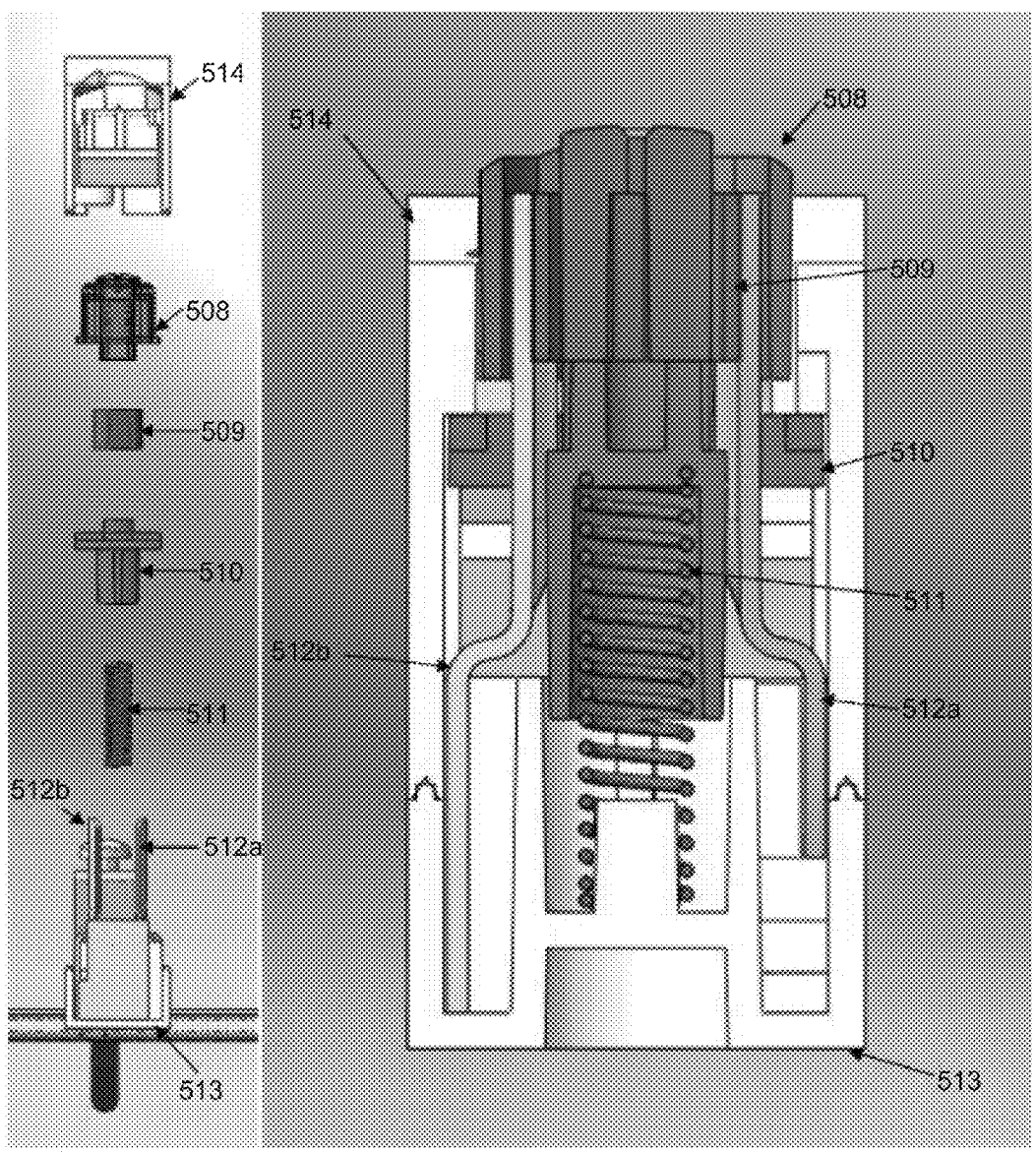
FIG. 17 is another exploded view of the device of FIG. 16.
FIG. 18 is an end sectional view of the device of FIG. 16.
Figure 19:
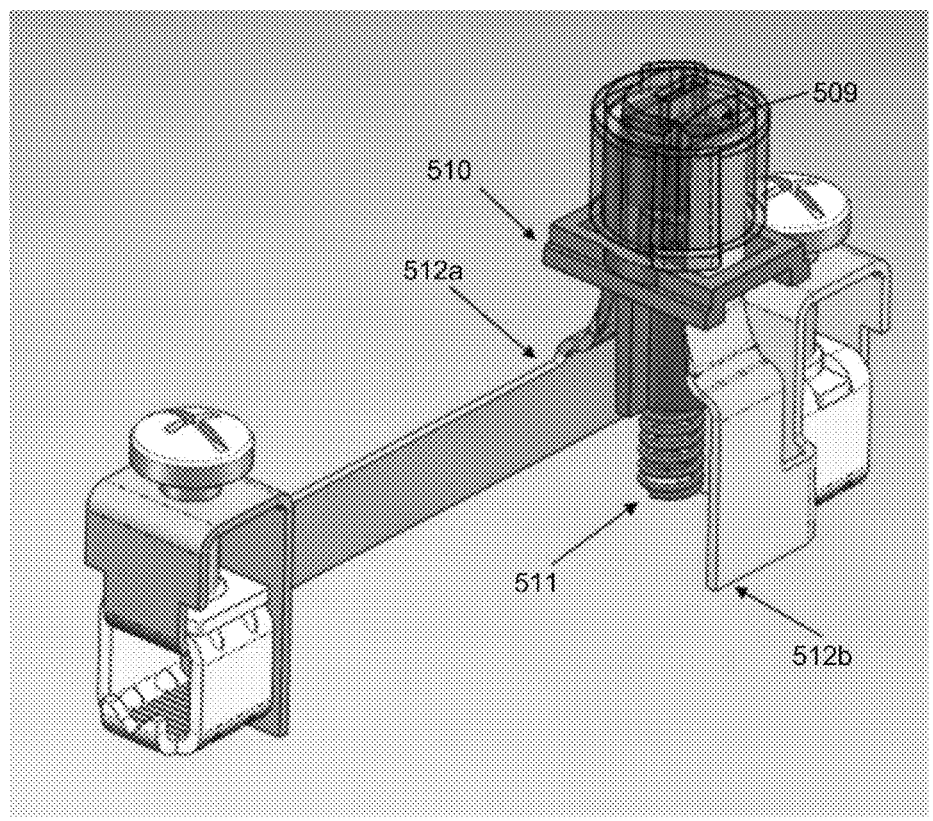
FIG. 19 is an oblique view of components of the device of FIG. 16, with the housing removed for illustration purposes.
Figure 20:
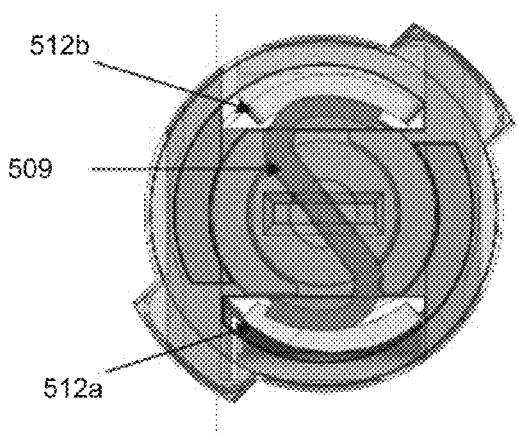
FIG. 20 is a plan view of a portion of the device of FIG. 16, with the device in a closed condition.
Figure 21:
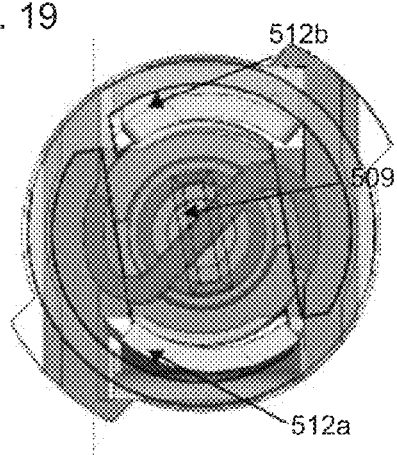
FIG. 21 is a plan view of a portion of the device of FIG. 16, with the device in an open condition.

FIGS. 16-21 show another embodiment, one that includes a button or cover 508, a S-shape or serpentine-shape jumper 509, a carriage or slider 510, a spring 511, terminals that include a first electrical connection 512a and a second electrical connection 512b, a housing bottom 513, and a housing top 514. FIGS. 16 and 17 are exploded views of this embodiment. FIG. 18 is a cross-sectional view. FIG. 19 shows some details of the interrelationship of the terminals, jumper, slider, and spring. FIG. 20 is a top view showing the button, jumper, slider, and terminals, with the device in the normally closed position. FIG. 21 is the same view with the device in the open position. Pushing the button or cover 508 downward, against the upward force provided by the spring 511, causes the jumper 509 to rotate until it is out of contact with the terminals 512a and 512b, electrically decoupling the terminals 512a and 512b. This also exposes the top ends of the terminals 512a and 512b for possible use as test points. A possible variant is to have straight terminal ends, rather than the curved terminal ends that are shown in the illustrations.

Many other variations are possible, and it should be understood that various features of the various embodiments may be combinable with one another. For example, any of the various connection methods (posts or conductor-receiving slots secured by screws) may be used with any of the various coupling/decoupling mechanisms. In addition, a wide variety of other mechanism for jumper coupling and decoupling are possible.

For all of the embodiments, the device is mainly made of plastics for the button/cap and conductive metals for the jumper and terminals. Suitable plastics for this application include thermoplastics and thermoset polymers in any number of manufacturing methods including, but not limited to the following: injection molding, compression molding (bulk molding), extrusion or three-dimensional printing. Suitable metals for this application include, but are not limited to the following: copper alloys, aluminum alloys, tin-plated copper alloys or tin-plated aluminum alloys. Other alloys or materials (such as steel, iron or stainless steel) which are suitable to the conductivity and corrosive requirements of the application may be substituted.

The device with the disconnect provides many advantages over prior devices. For railroad applications, the device is more compact than certain prior devices such as existing binding post disconnects that require removal of a "gold nut" per AREMA 14.1.15, for testing. Use of the gold nut requires the extensive use of threaded hardware and washers. This process of disconnecting and testing is laborious, increases potential for errors during assembly, and adds additional electrical resistance to the circuit by adding more connections and requiring conduction through the threaded posts. Users are required to loosen and tighten each piece of hardware individually. Additionally, the use of the gold nut does not allow for easy implementation of a "finger safe" solution. Eliminating the gold nut and test link, as is done in the devices described above, reduces labor cost by reducing the time required to disconnect, test and reconnect the circuit.

Other advantages are that the proposed disconnect is IP20 "finger-safe" (IEC/NEMA) which protects operators and signal lines alike. The proposed disconnect utilizes a simpler configuration with fewer components, such as by avoiding numerous threaded studs, specialized nuts, and rubber spacers. Easy test point access allows for use of alligator clips for testing. The terminals allow for unobstructed clear access form the top side of the device, which allows for easier access with the large alligator clips commonly used for HiPot testing. Posts can be eliminated altogether in exchange for cage clamp terminals. An embodiment described above allows for testing/probing of both sides of the signal circuit. Further, the proposed disconnect is easier to use due to a push button or toggle design rather than a pull type design with a small knob.

Prior surge devices and terminal blocks typically require a stand-alone disconnect or switch which is then electrically connected to the device/block in question. The embodiments described herein, in contrast, integrate the disconnect into the surge device/terminal block, which allows for the overall system to be much smaller by eliminating the stand-alone block and any additional connections which will add resistance to the circuit. The present device eliminates an unnecessary labor step of connecting an additional stand-alone switch/disconnect. The present device also does not require users to disconnect the terminal blocks in order to open the circuits for testing.

Many alternative configurations are possible. The disconnect mechanism could be incorporated into either the base or surge module. The entire mechanism could be rotated such that it rotates and translates about a horizontal axis as opposed to a vertical axis. Essentially, rotating the device 90 degrees would give the device the same components and overall function. As another variant, the cover (push button) and carriage (slider) could be combined into one single piece. The slider could incorporate the locking mechanism instead of the button. The metallic spring could be replaced with another spring element such as a plastic or other suitable spring. The contacts could be re-arranged into a wiping contact configuration. Further, the terminals may be connected to the signal or power circuit using either cage clamps or post connection points.

Feature to Ensure Proper Grounding of a Modular Surge Device

The NEMA Surge Protection Institute defines a surge "a transient wave of current, voltage or power in an electric circuit. In power systems in particular—and this is likely the most common context that we relate surges to—a surge, or transient, is a subcycle overvoltage with a duration of less than a half-cycle of the normal voltage waveform. A surge can be either positive or negative polarity, can be additive or subtractive from the normal voltage waveform, and is often oscillatory and decaying over time. Surges, or transients, are brief overvoltage spikes or disturbances on a power waveform that can damage, degrade, or destroy electronic equipment within any home, commercial building, industrial, or manufacturing facility. Transients can reach amplitudes of tens of thousands of volts. Surges are generally measured in microseconds."

Surge protection devices (or surge supressors, hereafter referred to as surge devices) provide surge protection for electrical lines and often incorporate a grounding connection into the mounting mechanism which attaches to a grounding bus or metallic structure. A surge device connects at least two sides (i.e. "input and output" or "line and equipment") of an electrical line (copper wires or other electrical conductors) which transmit either power or signals. The surge device also incorporates a connection to an "Earth" ground (hereafter referred to as "ground"). The surge device activates when a surge is present and dissipates the excess energy to ground.

Ensuring that a connection is made from the surge device to the grounding system often requires testing or visual inspection. Incorporating a mechanism which consistently makes a suitable connection when a ground connection is made will ensure a proper path to ground. Further errorproofing the mechanism by preventing full installation of the device prior to making a proper grounding connection will ensure that the surge device is installed and assembled with a low-impedance path to ground for proper dissipation of surge energy.

A modular surge device incorporates at least two components in the form of a base and a surge module. The base is pre-assembled by the equipment manufacturer and serves as the primary connection means of the surge module to the ground and the electrical lines requiring protection. During installation of the base, the electrical lines are connected to the base using built-in connection means such as screw terminals, binding posts, poke-in connections or spring-type terminals. During installation, the base is also electrically connected to ground using the grounding system at the installation site. The connection to ground can be accomplished using either a ground lead (wire or other conductor) or using the mounting means (clamps, mounting bolts or snap clips) as a grounding mechanism which incorporates fastening as well as electrical connection. In the primary embodiment, the connection means are contained within a thermoplastic housing that forms the primary structure of the base. The base features access ports for connection to electrical lines, grounding connection as well as the interface with the surge module.

The surge module (also pre-assembled by the equipment manufacturer) is electrically connected to the base, thereby completing installation and assembly of the modular surge device. In doing so, the surge module is simultaneously connected to ground and the electrical lines requiring protection. The surge module contains surge protection components which may include but are not to limited spark gaps, gas discharge tubes, metal oxide varistors (MOV), silicon avalanche diodes (SADS), positive temperature coefficient (PTC) thermistors, circuit breakers, or fuses. In the primary embodiment, the surge components are contained within a thermoplastic housing that forms the primary structure of the surge module. In the primary embodiment, the surge module features metallic electrodes protruding from the bottom face of the thermoplastic housing. These electrodes serve as the primary connection means between the surge module and the base. In the primary embodiment, snaps are incorporated into the surge module housing to add increased mating security between the surge module and the base, however these are not required in the described embodiment.

When a surge is present in the electrical lines, the surge module activates to dissipate this excess energy by redirecting it to ground. Said surge modules are often expendable (disposable) meaning that the devices are destroyed or damaged during extreme surge events or at the end of their usable life. As such, the surge modules described are replaceable in a manner similar to that of replaceable fuses.

The invention disclosed in this document is an obstructive feature (hereafter referred to as the "poka-yoke post") incorporated into a surge module which prevents the surge module from complete insertion into the base until the grounding mechanism (such as a clamp or coupler) is tightened forming a proper connection to ground. The base is mechanically and electrically connected to a structural member such as DIN Rail, strut, metallic strip, rods or other structural metallic element using a grounding mechanism which clamps or latches the base to the structural member. The connection to the structural member serves as the connection to ground for the base. The grounding mechanism and its fastener (screw, nut, lever or other device) are oriented in such a manner as to create an obstruction preventing the insertion of the surge module into the base by way of the poka-yoke post. When the grounding mechanism is engaged the mating interface between the base and surge module will be free of obstruction. In the primary embodiment, this is accomplished primarily by utilizing the assembly stack-up of the grounding mechanism fastener and the poka-yoke post. When the fastener is loosened it will rise vertically toward the top of the base, the fastener then interferes with the poka-yoke post on the surge module to prevent it from being mated to the base.

In the primary embodiment, the grounding mechanism also serves as the mounting means for the base, however this is not required in the described embodiment.

Figure 23:
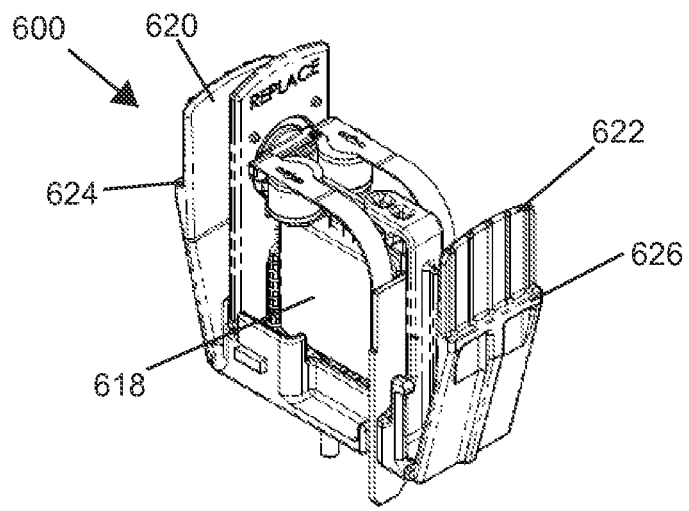
FIG. 23 is an oblique view of the surge module of FIG. 22, with part of the housing removed for illustration purposes.
Figure 22:
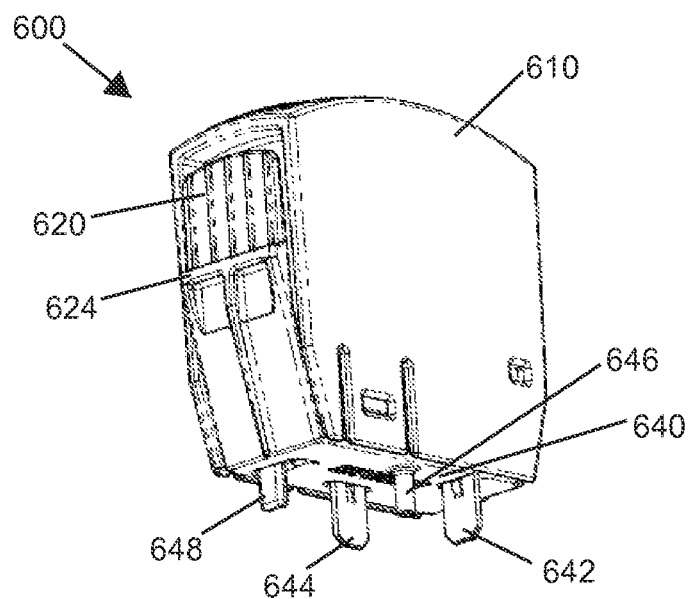
FIG. 22 is an oblique view of a surge module, in accordance with an embodiment of the present invention.

FIGS. 22 and 23 show a surge module 600 that is usable with any of the bases described above. The surge module includes a surge module housing 610, which houses a surge component (MOV) 618. On opposite sides of the housing 610 are a pair of finger tabs 620 and 622. The tabs 620 and 622 are configured to mechanically engage the ridges, such as the ridges 114 and 116 (FIG. 1), that are on either side of a socket for receiving the surge module 600. The tabs 620 and 622 resiliently bend inward as the surge module 600 is inserted into the socket. When steps 624 and 626 of the tabs 620 and 622 pass the ridges on the base housing the tabs 620 and 622 spring outward. This secures the surge module 600 in place, with the steps 624 and 626 interacting with the housing ridges to prevent easy dislodgement of the surge module 600 from the socket. To remove the surge module 600 from the socket a user may use his or her fingers to bend the tabs 620 and 622 inward toward the center of the surge module 600. This disengages the steps from the ridges, and allows removal of the surge module from the socket.

A bottom face 640 of the surge module 600 includes several protrusions that engage corresponding openings in the base housing, such as the ports 102-106 (FIG. 1) described above. The protrusions include a ground electrode 642, a line electrode 644, and a poka-yoke post (or just post) 646. The protrusions may also include other features, such as a protrusion 648 that is part of a spring-loaded mechanism indicating that the surge module 600 needs replacement.

The electrodes 642 and 644 make contact with and electrically connect up with corresponding conductive parts in the base, as has already been described above. The post 646 is used to prevent engagement of the surge module 600 with a base unless the base has been properly secured to a DIN rail or other structure.

Figure 24:
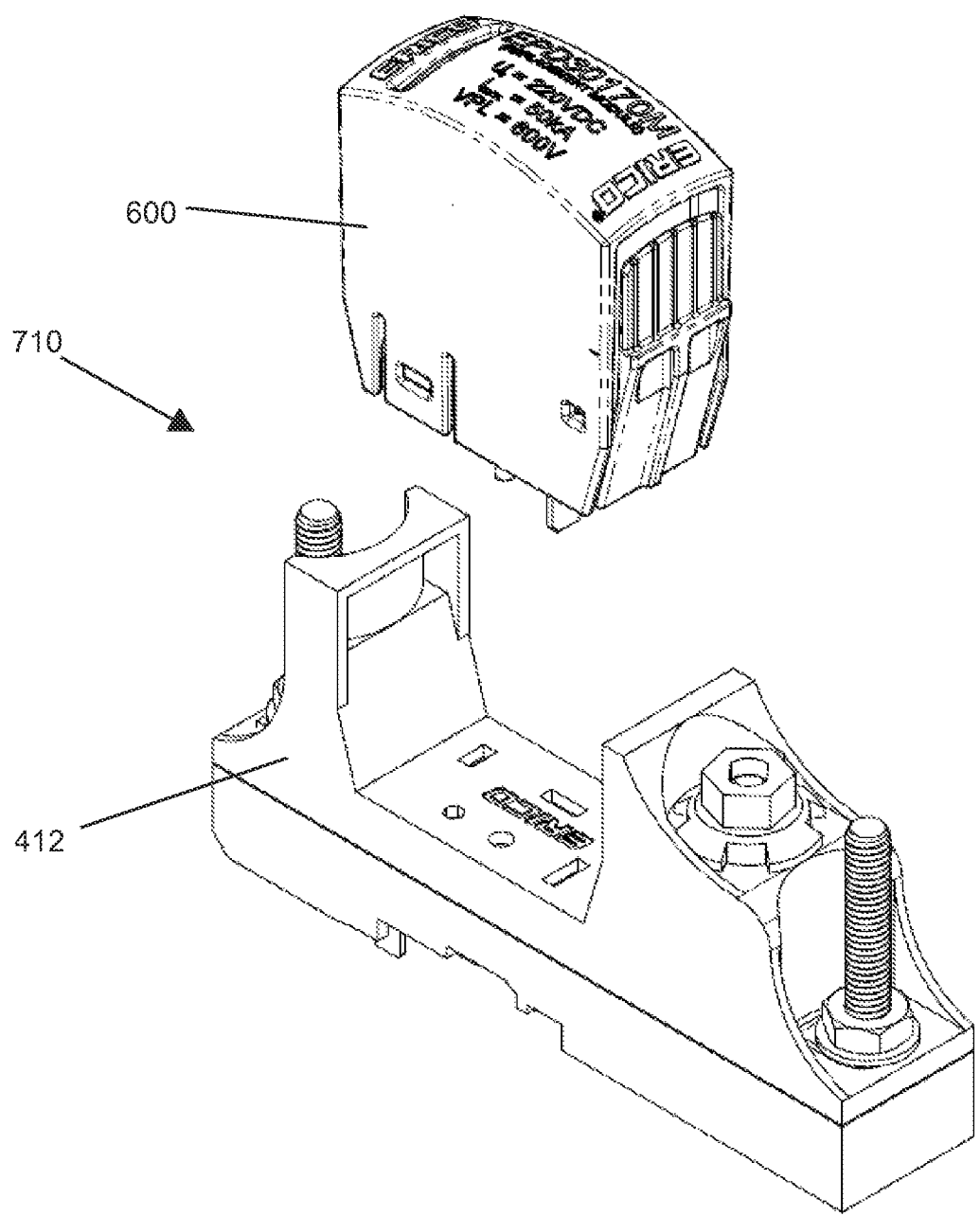
FIG. 24 is an oblique view showing a first step in the coupling of the surge module of FIG. 22, to a base, to produce an electrical coupling device.
Figure 25:
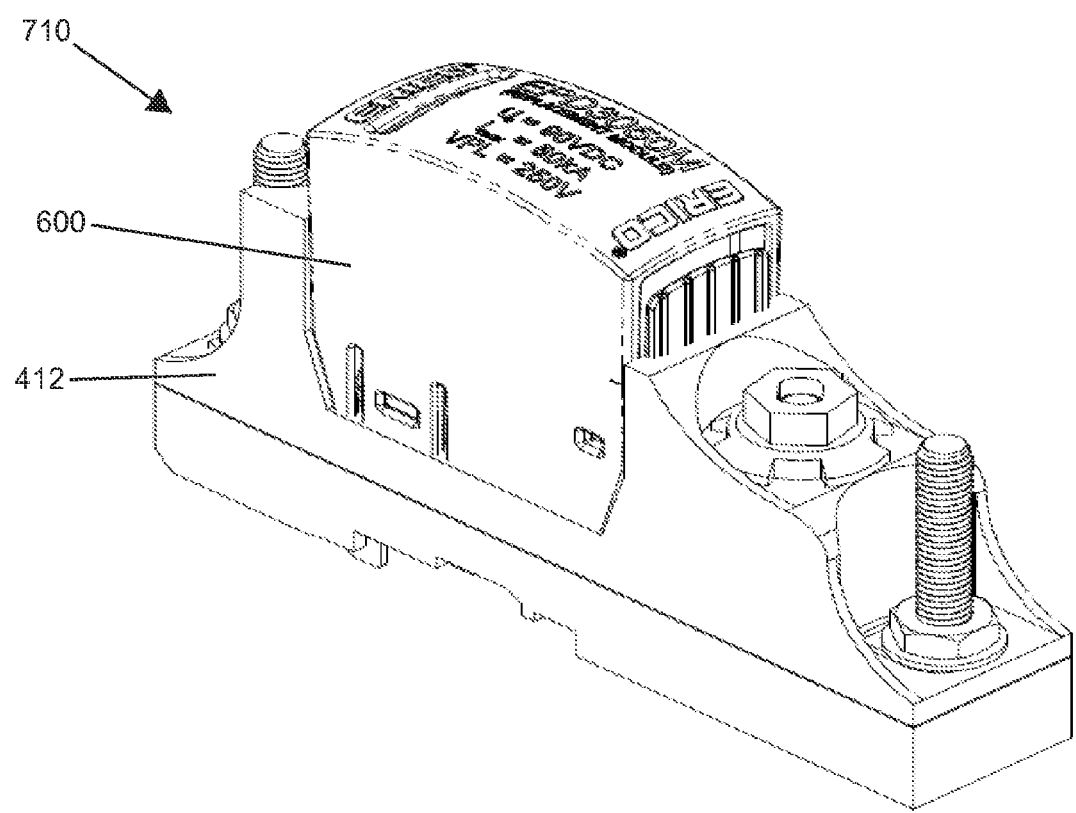
FIG. 25 is an oblique view of a second step of the coupling.

FIGS. 24 and 25 illustrate the process of engaging the surge module 600 a base. In the illustrated example the base is the base 412, with the combination forming an electrical device 710. Alternatively any of the other types of bases described herein might be used to engage the surge module 600.

Figure 26:
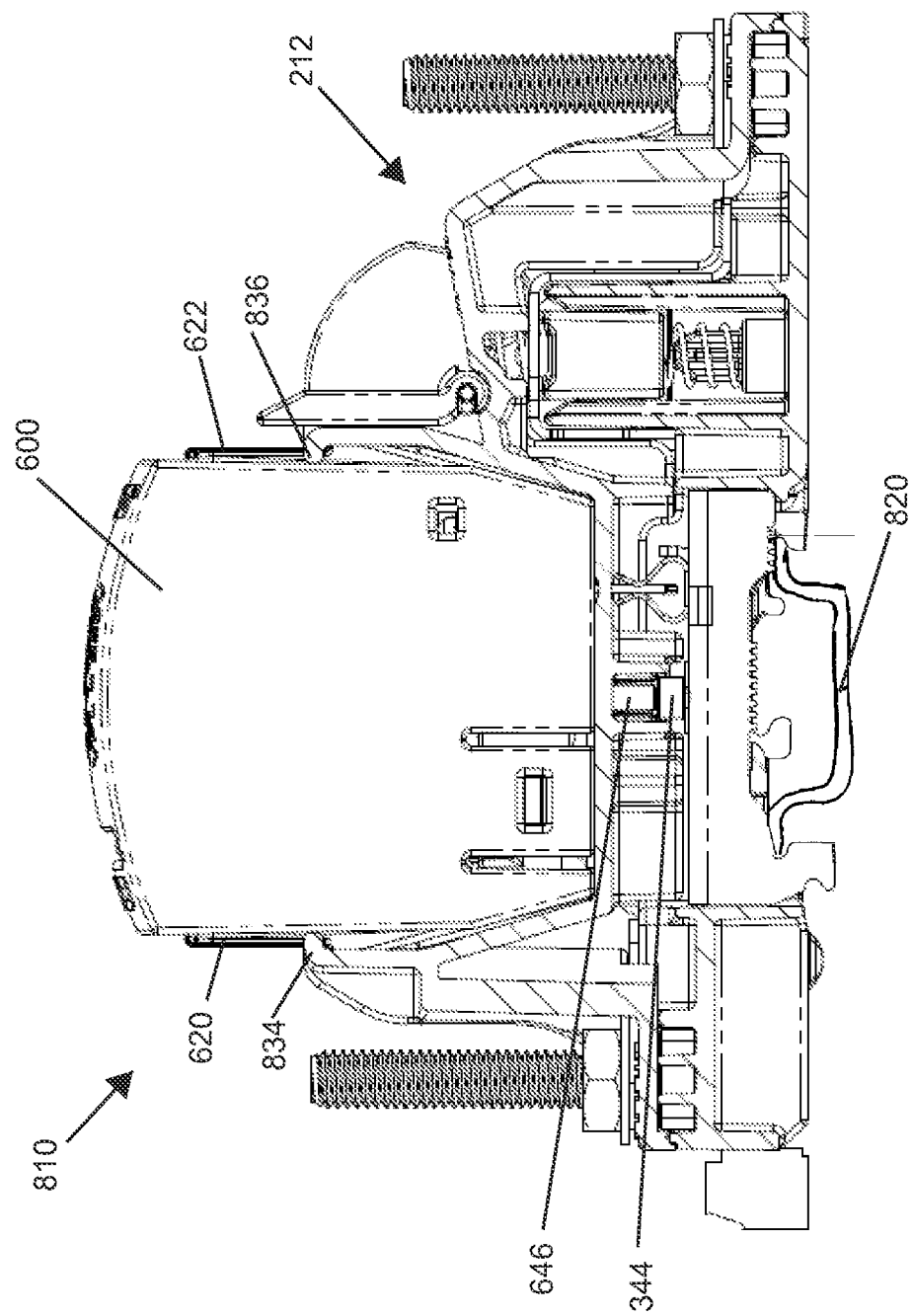
FIG. 26 is a side sectional view showing interaction of various parts, in the coupling of a surge module to a base that is installed on a DIN rail.
Figure 27:
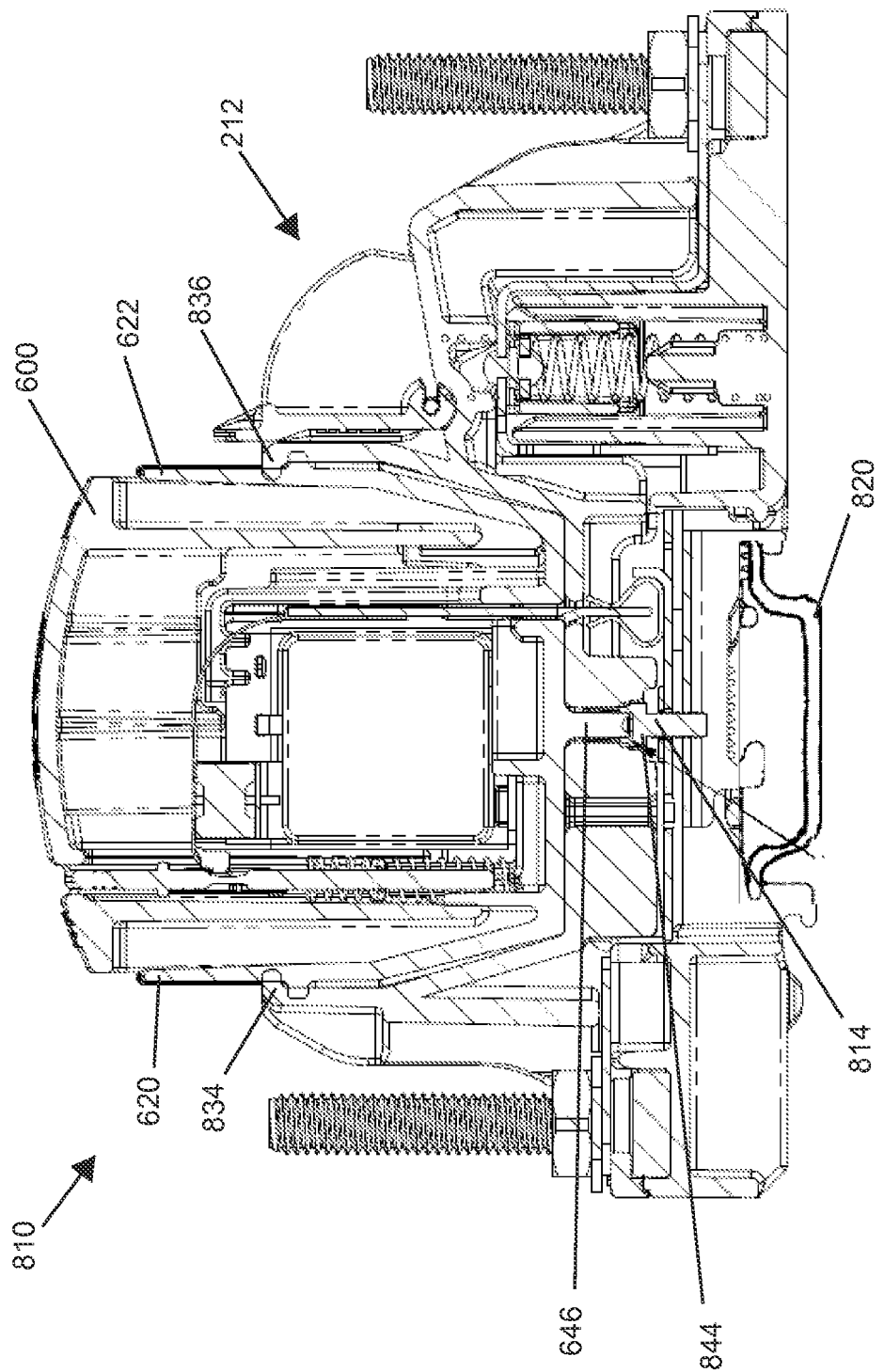
FIG. 27 is another side sectional view of the situation of FIG. 26.

FIGS. 26 and 27 illustrate the operation of the post 646 in allowing coupling of the surge module 600 to a base. In the illustrated embodiment the base is the base 212 described above, but alternatively any sort of base with a similar socket and interface may be used instead, to produce the electrical device 810 shown. When a fastener 814 of the base is tightened such that the base 212 is fully installed on the DIN rail 820 (or other structure), as is shown in the figures, there will be sufficient room to fully insert the post 646, and the tabs 620 and 622 will be able to engage ridges 834 and 836, to mechanically couple the surge module 600 to the base 212. Thus with proper mechanical and electrical coupling of the base 612 to the DIN rail 820 (including proper engagement of a grounding mechanism of the base 612 with the DIN rail 820 or other structure), mechanical coupling of the surge module 600 to the base is possible.

However improper or incomplete installation of the base 212 onto the DIN rail 820 will prevent full engagement of the surge module 600 and the base 212. In a failed assembly condition with an improperly tightened DIN rail a head 844 of the fastener 814 is higher up within the housing of the base 812. This screw head 844 causes interference with the poka-yoke post 646, preventing full engagement of the surge module 600 with the base 212. The improper engagement can prevent the mechanical coupling of the tabs 620 and 622 to the ridges 834 and 836. This failure of coupling is obvious to a user, who will then be cued to remedy the problem by properly securing the base 212 and the DIN rail 820 together.

Note that in FIG. 28 the screw head causes interference with the poka-yoke post, preventing full engagement of the surge module with the base.

The ground mechanism fasteners could be manufactured from suitable metals, plastic, composites or ceramics, so long as the functional requirements of the assembly are met. The poka-yoke post on the surge module could also be made from any metals, plastic, composites or ceramics so long as the functional requirements of the assembly are met. The conductive element of the ground mechanism could conceivably be made from any metallic material sufficient to conduct electricity for the required applications. Steel, copper, aluminum, stainless steel, nickel, tin or any combination of bare or plated conductive metals could be used. An injection-molded plastic interference feature may be used on the surge module and a machine screw in the grounding mechanism.

Prior devices have often relied on the installer to verify the connection to ground independently of the insertion of the surge module. In prior installations either a ground wire is connected to the module, or the ground connection is incorporated into the mounting mechanism and is only verified by inspection or testing (i.e., Resistance Measurement or Continuity).

Many alternatives are possible to the embodiment described above. The surge module housing may be made of other suitable materials, such as metal alloys, or take on a different form factor. Instead of the rectangular shape in the illustrated embodiment, the module could be circular, triangular, trapezoidal, octagonal or square. The interference feature is shown as a cylindrical post, but could alternatively be cubic, pyramid, tetrahedral, spherical, conical, or any number of suitable shapes. The cylindrical post could conceivably be removed altogether such that the screw only interferes with the bottom face of the surge module.

The screw in the clamping mechanism could be replaced by any number of threaded fasteners such as nuts, threaded rod, set screws, or acme screws. As another alternative, the grounding mechanism may include a cam lever, locking lever or push button as opposed to a screw mechanism. The method of engaging the grounding mechanism in order to achieve a low-impedance path to ground could be achieved by either tightening OR loosening a fastening mechanism (screw, nut, lever, button, etc.). For instance, a spring-loaded grounding mechanism which latches around the DIN rail in its "at rest" position would require disengagement by a actuator (such as a screw turned counter-clockwise).

Modular Surge Device Having Base with Binding Posts, and Plug-in Surge Module

In the railroad industry, threaded binding posts (or AAR Posts, hereafter referred to as "posts") are commonly used for electrical terminations in trackside signaling enclosures, switchgear and various other railroad applications. The use of posts is driven by the various railroads and governed by AREMA specifications, specifically AREMA Standard 14.1.10. For many decades, the use of posts has been standard among all railroads that comply to AREMA standards. In an effort to accommodate this standard and provide a more modern and easier to use product, a modular surge device was developed to allow for the termination of ring terminals or wrapping, "hooked", wires using posts.

A modular surge device incorporates at least two components in the form of a base and a surge module. The base is pre-assembled by the equipment manufacturer and serves as the primary connection means of the surge module to the ground and the electrical lines requiring protection. The surge module (also pre-assembled by the equipment manufacturer) is electrically connected to the base, thereby completing installation and assembly of the modular surge device. The base features at least two posts for the termination of the electrical line requiring protection. The base functions as a splice, connecting two sides of the same circuit as well as providing mating features for the surge module. In this embodiment, the posts are utilized to terminate the electrical conductors utilizing ring terminals, or by wrapping the wire around the posts. Several pieces of hardware are then used to clamp the conductor per end users specifications.

Posts at opposite ends of the base are electrically connected to one another via metallic components within the base. The metallic components are optionally interrupted with the use of a disconnect mechanism. The disconnect mechanism (as previously described) allows for testing of the electrical lines without harming equipment or the surge module. The posts serve as the preferred termination method for railroads that comply with AREMA in respect to power and signal lines.

This invention proposes to eliminate the need for surge modules which are bolted to the AAR terminal blocks using posts as the connection means. Such surge modules are embodied by ERICO's Electronic Track Signal Protection (ETSP) and the standard Invensys/Safetran/Siemens spark gap arrestor (Clearview Lightning Arrester). Eliminating the need to use posts, nuts and washer allows for easier installation and replacement of the surge module. Doing so allows for a more modern and functional surge module which may incorporate visual and tactile notification, easy replacement and optional remote monitoring functionality.

Additionally, the proposed surge device will mount to and be grounded using metallic DIN rail. Traditionally, terminal blocks in the railroad industry are individually attached to a plywood back plane using wood screws. Mounting the surge device to the DIN rail allows for easier installation and replacement of the base by providing a simplified mounting mechanism as well as moving the grounding conductor from the top of the base to the bottom. The DIN rail is additionally bolted to a structure and is connected to the grounding system at the installed location.

Various embodiments of the base that have been described above, such as the base 212 (FIG. 6) and the base 412 (FIG. 8), may be combined with a surge module, such as the surge module 600 (FIG. 22) to produce module devices with binding posts, as has been described in the immediately preceding paragraphs. Threaded posts of such bases may be used for wire termination, with the bases themselves being used to engage DIN rails or other structure, such as for grounding purposes. It will be appreciated that a wide variety of bases and surge modules, including variations not described heretofore herein, may be used for such modular devices.

The housing and non-conductive parts may be made of suitable plastics, such as thermoplastics and thermoset polymers. Any of a variety of suitable manufacturing methods may be employed, including without limitation injection molding, compression molding (bulk molding), and/or extrusion or three-dimensional printing. Conductive parts may be made of suitable metals including but not limited to copper alloys, aluminum alloys, tin-plated copper alloys or tin-plated aluminum alloys. Other alloys or materials (such as steel, iron or stainless steel) which are suitable to the conductivity and corrosive requirements of the application may be substituted.

Prior devices which incorporate the posts are out-dated by modern devices such as ERICO's UTB and RTB devices. The disadvantage to using these devices is that the UTB and RTB do not incorporate posts (which are preferred by many railroads that comply with AREMA standards) nor do they incorporate an integral disconnect. ERICO's Universal Terminal Block does not incorporate an easily replaceable surge module nor does it incorporate a simplified grounding and mounting mechanism as described in the herein. The modular device shown in FIGS. 29-32 and described above overcomes these limitations.

The base and surge module are presently designed as plastic, but could be made from other non-conductive materials, composites, ceramics or materials which are coated nonconductive material (i.e. metal over-molded in plastic, painted or dipped in non-conductive coatings).

The implementation of the posts could be reversed such that a threaded insert (or nut) is captured in the housing as opposed to a threaded stud. A threaded rod or bolt would then thread into the insert and serve as the clamping mechanism.

The posts can be oriented to point away from the DIN rail (upwards) or toward the DIN rail (downward) such that they would extend past the bottom of the base, past the DIN rail and into the space below. This would require access through the structure to which the DIN rail is mounted as well as any additional protection required to prevent the posts from being electrically shorted to the structure.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electrical coupling device comprising:
   a base housing;
   a pair of electrical terminals; and
   a jumper;
   wherein the terminals and the jumper are located within the base housing;
   wherein the jumper is part of a movable member that rotates around a rotations axis passing through a center of the movable member to selectively electrically couple and decouple the terminals together via the jumper; and wherein rotating the movable member about the rotational axis selectively uncovers one or more portions of the terminals and/or the jumper as a test point, to allow electrical access to one or both of the terminals, such as for testing.

2. The device of claim 1, wherein rotation of the movable member moves the jumper axially.

3. The device of claim 2, wherein the jumper includes a threaded rod that engages a threaded hole in a member that is fixed with respect to at least one of the base housing or the terminals.

4. The device of claim 3, wherein the test point is an exposable end of the jumper that is exposed when terminals are electrically decoupled.

5. The device of claim 2, wherein the jumper passes through respective concentric holes in the terminals.

6. The device of claim 5,
further comprising an insulator that the jumper passes through;
wherein the insulator is between parts of the terminals, and maintains separation between the terminals.

7. The device of claim 5, wherein the jumper includes an annular member that presses against and electrically couples to one of the terminals, around as the hole in the one of the terminals.

8. The device of claim 1, further comprising respective binding posts electrically coupled to the terminals.

9. The device of claim 1, further comprising a mounting for mounting and electrically coupling the device to a rail.

10. The device of claim 9, wherein the mounting includes one or more of clamps, mounting bolts, or snap clips.

11. The device of claim 1,
in combination with a surge module mechanically coupled to the base housing and engaging the electrical terminals;
wherein the surge module includes:
a surge module housing;
one or more surge protection components within the surge module housing; and
metallic electrodes protruding from a bottom face of the surge module housing, for electrically coupling the one or more surge protection components to the electrical terminals.

12. The device of claim 11, wherein the surge module includes an interface feature that engages a corresponding feature on the base housing, to prevent mechanical coupling of the surge module with the base housing at an improper orientation, and/or if the base housing is not properly installed on a structural member.

13. An electrical coupling device comprising:
a base that includes:
a base housing;
a jumper, the jumper coupled to a rotating member;
a pair of electrical terminals;
wherein the rotating member defines a rotational axis passing through a center of the rotating member;
wherein rotating the rotating member about the rotational axis selectively electrically couples and decouples the electrical terminals together via the jumper; and
a surge module mechanically coupled to the base housing and engaging the electrical terminals;
wherein the terminals are located within the base housing; and
wherein the surge module includes:
a surge module housing;
one or more surge protection components within the surge module housing; and
metallic electrodes protruding from a bottom face of the surge module housing, for electrically coupling the one or more surge protection components to the electrical terminals.

14. A surge module for coupling to a base to be mounted on a structural member, the module comprising:
a surge module housing;
one or more surge protection components within the housing;
a fastener, the fastener positioned on the base; and
an interface feature that engages the fastener on the base, to prevent mechanical coupling of the surge module with, the base at an improper orientation, and/or if the base is incompletely coupled to the structural member.

15. A method of providing surge protection, the method comprising:
installing a base on a structural member, with a grounding member of the base electrically coupling to the structural member, wherein the installing the base includes using a fastener to couple the base to the structural member; and
after the installing, mechanically and electrically coupling a surge module to the base, wherein an interface feature of the structural member engages the fastener to prevent mechanical coupling of the surge module with the base at an improper orientation or if the base is not properly installed on the structural member.

16. The method of claim 15,
wherein the structural member is a rail;
wherein the fastener is a threaded fastener; and
wherein the installing include threading the fastener into the rail.

17. The method of claim 15, wherein the coupling the surge module to the base include coupling metallic electrodes protruding from a bottom face of the surge module, to electrodes of the base that are electrically coupled to the structural member during the installing of the base.

18. The device of claim 1, wherein the rotational axis is vertical.

19. The device of claim 13, wherein the rotational axis is vertical.

* * * * *